(12) United States Patent
Tilles

(10) Patent No.: US 6,201,203 B1
(45) Date of Patent: Mar. 13, 2001

(54) ROBOTIC CONTAINERIZATION SYSTEM

(75) Inventor: David J. Tilles, Woodstock, MD (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/310,222

(22) Filed: May 12, 1999

(51) Int. Cl.[7] ..................................................... B07C 5/00

(52) U.S. Cl. ......................... 209/584; 209/540; 209/922; 209/933

(58) Field of Search ............................ 209/540, 541, 209/542, 545, 559, 563, 564, 583, 584, 587, 922, 933

(56) References Cited

U.S. PATENT DOCUMENTS

| | | | |
|---|---|---|---|
| 4,310,276 | * | 1/1982 | Castagnoli ........................ 209/933 |
| 5,222,855 | * | 6/1993 | Bernard, II et al. ................ 209/545 |
| 5,293,983 | * | 3/1994 | Grapes et al. ..................... 209/900 |
| 5,363,967 | * | 11/1994 | Tilles et al. ........................ 209/546 |
| 5,443,359 | * | 8/1995 | Miller et al. . | |
| 6,026,967 | * | 2/2000 | Isaacs et al. ....................... 209/900 |

\* cited by examiner

*Primary Examiner*—Katherine A. Matecki

(57) ABSTRACT

In a method and system for automatically forming a plurality of packages of groups of articles, the articles move along a conveying path in a substantially continuous motion. The selected articles are transferred to selected buffer storage assemblies in response to selection control signals from a central processing unit. The central processing unit generates the control signals according to predetermined packaging criteria. The groups of articles are stored in the buffer assemblies in a layer corresponding to one layer of a plurality of layers to be assembled in one of the plurality of packages. The entire layer in the buffer assembly is then transferred into an associated package at one time after assembly of that layer is completed from the accumulation of individual articles transferred from the conveying path. The articles are selectively oriented in the conveying path upstream of the buffer assemblies so that individual articles within each group may be oriented according to the predetermined packaging criteria. In the first embodiment, the buffer assemblies transfer selected articles from the conveying path into elevated positions above the conveyor until a complete layer is assembled. Articles moving to other destinations are able to pass under the buffered articles in a substantially continuous motion.

62 Claims, 23 Drawing Sheets

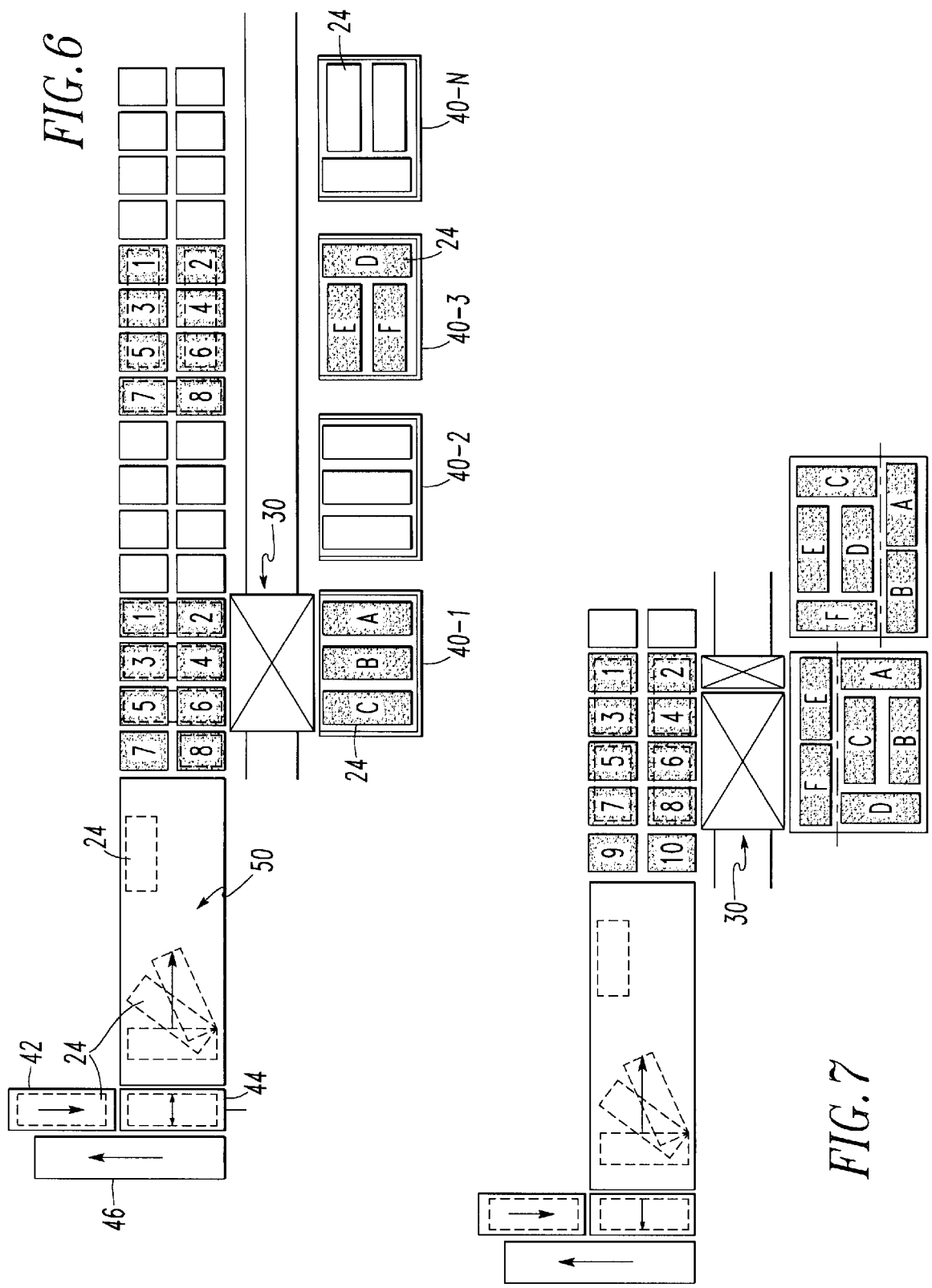

——— = AFTER ORIENTATION AND JUSTIFICATION
------ = AFTER ORIENTATION
— — = AS ENTERS ORIENTATION/JUSTIFICATION MODULE

ROBOTIC CONTAINERIZATION SYSTEM

BACKGROUND OF THE INVENTION

The present invention relates to an apparatus for automatically forming a plurality of packages of groups of articles. More specifically, the present invention relates to a robotic containerization system (RCS) that is configured for the efficient loading of U.S. Postal Service (USPS) mail containers such as all purpose containers (APCs) and pallets.

In a typical USPS operational facility, trays of mail are generated at various sorting operations. These trays are used to transport the mail between sorting operations, and once they have reached the level of sorting necessary for dispatch, they are placed on a conveyor that takes them to the dock area for transport to other facilities. On the dock, the trays are sorted to the destination facility, and loaded into containers. Depending on the destination the trays may be sleeved and strapped (for the air transport or long truck transport), or may be left opened for local truck transport. In most conventional facilities, the sorting and container loading process is performed manually.

There are several problems inherent in systems of the prior art for performing these sorting and loading operations. In the early portion of transit of an article passing through the system, the rate of generation of trays will be low, such that even one person located at a given run-out conveyor will be under utilized to keep pace with the rate of arriving trays. However, during heavier volume, the mail handler is faced with a demanding labor-intensive task involving repetitive heavy lifting (up to 35 pounds for trays, 70 pounds for flat tubs). Due to the demanding nature of the tasks and the varying conditions of the trays, the risk exists of dropping a tray, further reducing the efficiency of this operation. In an attempt to reduce labor costs, reduce work place injuries and improve operational efficiency, the USPS has typically deployed robotic work cells to perform the container loading functions. Currently, the USPS is deploying pedestal robot work cells that perform a 12-way sort and container loading function, and gantry robots. These cells utilize conventional material handling robots that are typically manufactured for extremely heavy-duty, high precision applications.

The gantry robot layout is more floor space efficient than the pedestal configuration, but the gantry robot requires significant head-room (approximately 13 feet) or a very specialized telescoping Z axes. Gantry robots tend to be large and expensive also. Although the gantry can be configured to meet specific operational needs of a facility once installed, it cannot easily be modified if operational requirements change.

The operation of these robotic cells has very similar characteristics. Trays arrive on an input conveyor in a random sequence. A bar-code reader at the end of the conveyor scans the tray and determines the appropriate container. The robots utilize a vacuum gripper that picks up one tray at a time. The use of a vacuum gripper requires that the tray be sleeved and strapped so there is a flat surface on top of the tray for the suction cups to grab. These grippers of the robots transporting one tray at a time result in system throughputs of approximately, only 6 to 7 trays per minute.

Accordingly, a need in the art exists for an improved automatic container loading system configured for more efficient loading of USPS mail trays into USPS containers such as all purpose containers (APCs) and pallets.

SUMMARY OF THE INVENTION

Accordingly, it is a primary object of the present invention to provide a system and method for automatically loading containers such as USPS transport letter trays in an improved manner regarding cost, functionality, floor space and performance achieved as compared to prior art robotic technology.

It is another object of the present invention to provide an automatic container loading system utilizing in-line buffering which implements continuous flow processing of product immediately adjacent to the intended container in which the product will be packaged.

It is yet another object of the present invention to provide an automatic container loading system wherein transportation, orientation, buffering and container loading operations occur in parallel thereby maximizing throughput.

It is a further object of the present invention to provide an automatic container loading system which organizes the incoming products to build up a complete layer of products so that container loading can be done in complete layers at a time to form packages of multiple articles and thereby maximize throughput.

It is another object of the present invention to provide an automatic container loading system including a central processing unit control system providing programmability and flexibility to handle different type packages, container types and stacking patterns in the all purpose containers or pallets.

It is still a further object of the present invention to provide an automatic container loading system having the ability to handle open topped trays or sleeved trays.

It is another object of the present invention to provide an automatic container loading system having a small footprint and low profile.

It is still a further object of the present invention to provide an automatic container loading system having a modular design.

The objects of the present invention may be fulfilled by providing apparatus for automatically forming a plurality of packages of groups of articles comprising:

transport conveyor means for moving a plurality of the articles along a conveying path in a substantially continuous motion;

a plurality of buffer storage assemblies disposed in spaced positions along the conveying path, each buffer storage assembly being capable of receiving groups of articles from the transport conveyor while other articles thereon sustain substantially continuous movement;

transfer means for selectively moving selected groups of articles to selected ones of the buffer storage assemblies in response to selection control signals; and control means for generating the selection control signals according to predetermined packaging criteria for each package of the plurality of groups of articles to be formed at each of the respective buffer storage assemblies.

In a first embodiment, the transfer means comprises elevator assemblies for lifting the groups of articles from the transport conveyor into the buffer storage assemblies. The elevator assemblies include a plurality of finger-like conveyors defining shelves for engaging the bottoms of the containers. The fingers are vertically movable in selected groups between the transport conveyor and the buffer storage assemblies. The selected groups of fingers define buffer shelves. The fingers are disposed between a plurality of spaced rollers of the transport conveyor in an initial or normal position before being actuated to the extended elevated positions where a layer of articles is formed into selected patterns. Trays for other destinations can pass freely below the elevated fingers on the transport conveyor.

In a second embodiment of the present invention the in-line buffer assemblies include buffer wing assemblies mounted on a raising/lowering mechanism adjacent to a sorting conveyor. Trays are laterally transferred from the sorting conveyor to the wing assemblies instead of storing the containers in elevated positions above the transport conveyor as in the first embodiment. The buffer wing assemblies each include a plurality of rollers journaled into appropriate frame members which are freely rotatable permitting a tray to freely roll thereon in response to lateral forces applied to the trays. The rollers are disposed orthogonally to the axis of motion of the transport conveyor. The lateral force for transferring selected trays to selected buffer zones on the rollers of the buffer wing assemblies is created by the diverting action of the sorting conveyor. This sorting conveyor is a powered roller conveyor with right angle transfer. Once a complete layer of trays is assembled on the buffer wing assemblies, the buffer wing is lowered to where the layer of trays may be transferred to a loading manipulator and placed into an all purpose container or onto a pallet.

In a third embodiment, the sorting transport conveyor comprises a plurality of parallel, spaced, conveyor belts extending longitudinally of the conveyor. The belts are driveable longitudinally to transport trays to be sorted, instead of using the powered rollers of the second embodiment described hereinbefore. Also in the third embodiment, powered ejection rollers are interleaved between the spaced belts. The ejection rollers can be raised to lift the trays off the belts, and transfer the trays right or left to an appropriate buffer wing.

The following types of mail trays are referred to herein:

MM trays—which are standard size USPS mail trays.

½ M or SMM trays—which are half as long as MM trays.

EMM trays—which are the same length as MM trays but taller.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 6 is a diagrammatic view depicting the operation of the container loading system of FIG. 1, and the various patterns in which the mail trays may be loaded into a plurality of all purpose containers (APCs);

FIG. 7 is a diagrammatic view illustrating the operation of the container loading system of FIG. 1 for loading pallets instead of the APCs in a brick-laying pattern;

FIGS. 14–17 are flowcharts illustrating the software process control for trays passing through container loading systems of the present invention;

DESCRIPTION OF PREFERRED EMBODIMENTS

Figure 1:
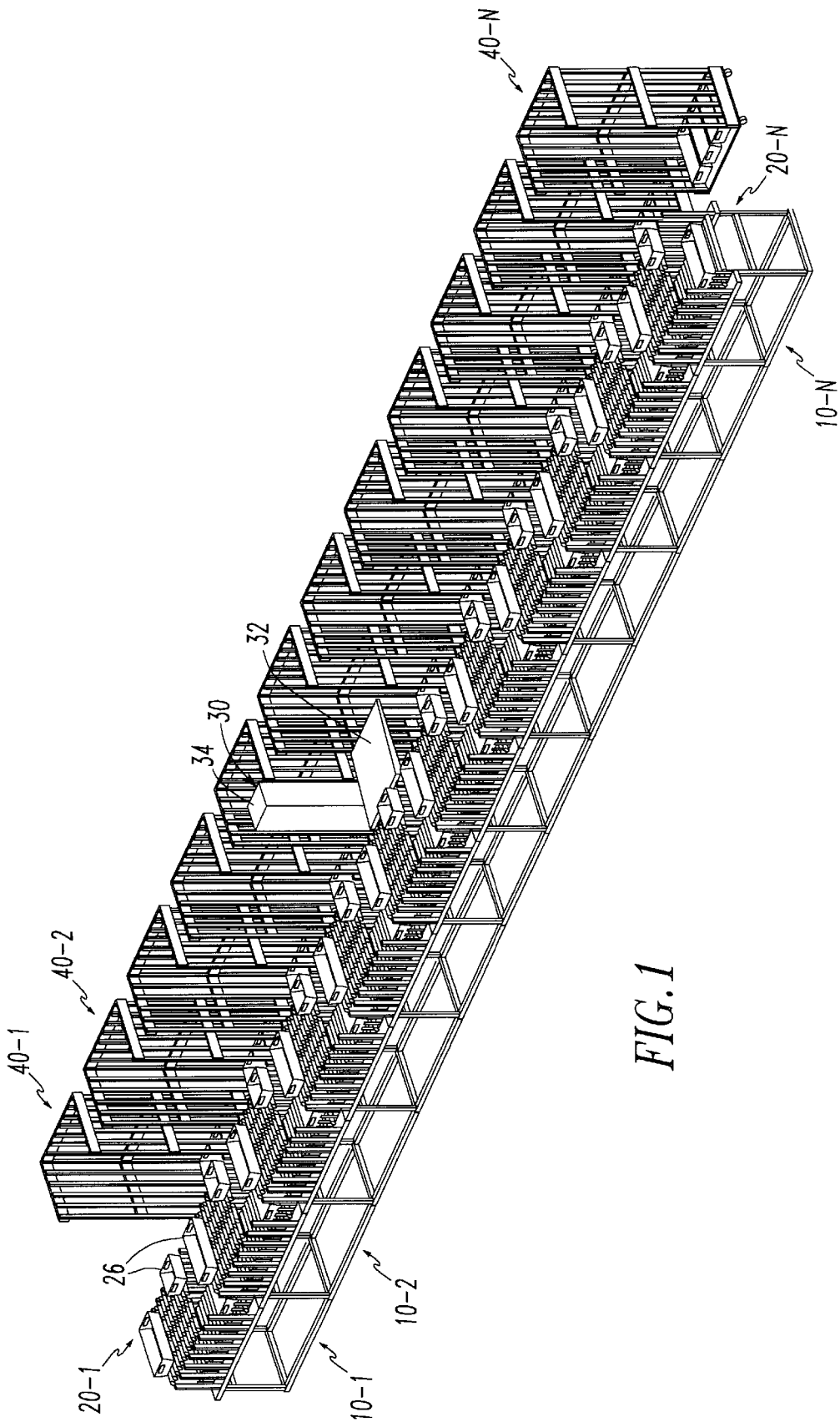
FIG. 1 is a perspective view of a first embodiment of the automatic container loading system of the present invention showing its modular design.

Referring in detail to FIGS. 1 to 4, FIG. 1 illustrates the conveyor system of a first embodiment of the present invention comprising a plurality of modules placed in-line. The modules include transport conveyor sections 10-1 to 10-N; in-line buffer sections 20-1 to 20-N; and all purpose containers (APCs) 40-1 to 40-N. A loading manipulator 30 including a platform 32 mounted for vertical movement on a post 34 is mounted on a track on the floor of the warehouse between the conveyors 10; in-line buffer sections 20, and an associated one of the plurality of all purpose containers 40. Loading manipulator 30, and its associated post 34, move longitudinally of the modules 10, 20 and the APCs 40 for alignment (one at a time) with a chosen module assembly under the control of a program in the central processing unit of the control system of the present invention and various readers or sensors. A plurality of mail trays 26 are shown in the perspective view of FIG. 1 at various positions before being transferred into the APCs 40 in a manner to be described more fully hereinafter with reference to FIG. 6.

Figure 2:
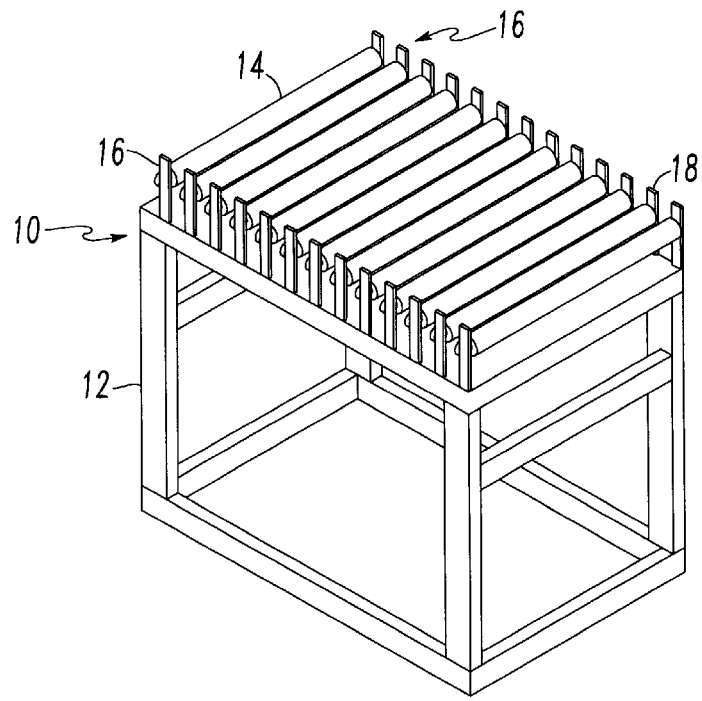
FIG. 2 is a perspective view of the transport conveyor module portion of the first embodiment of the present invention illustrated in FIG. 1.

Each of the conveyor sections 10 includes a base frame 12, upstanding side rails 16 and a plurality of rollers 14. The side rails include a plurality of spaced slide bars 18 for supporting the powered rollers 14 and permitting the movement of buffer finger conveyors 22 therebetween. FIG. 2 shows a single transport conveyor module 10 separated from the rest of the associated modules of FIG. 1 for clarity.

Figure 3A:
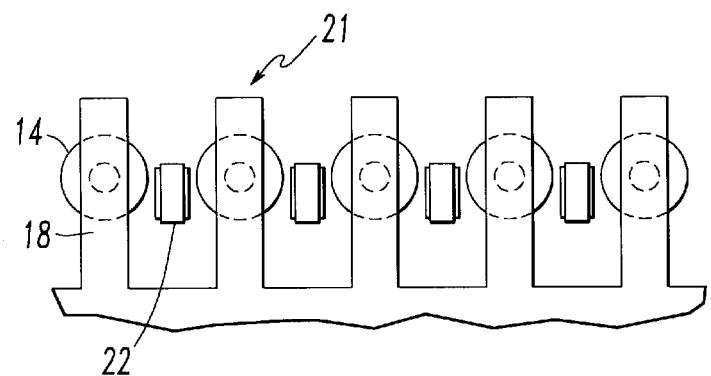
FIG. 3A is a side elevational view showing the details of the relative positions of the rollers of a conveyor module, and a plurality of buffer fingers from the associated in-line buffer module.
Figure 3B:
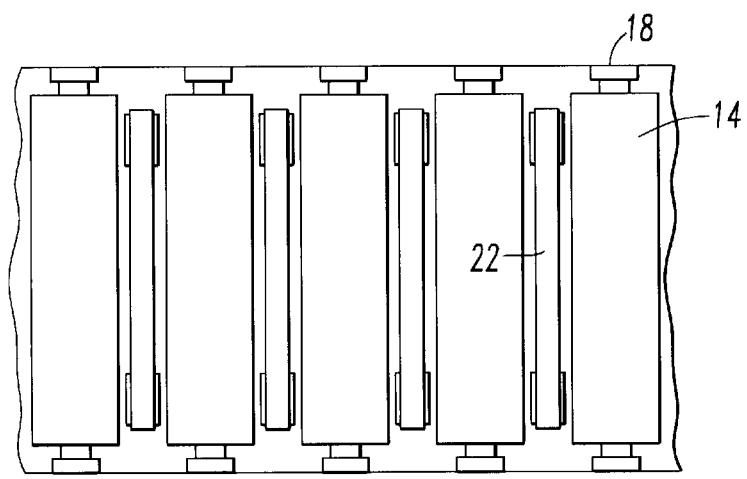
FIG. 3B is a top plan view of the detail of FIG. 3A.

FIGS. 3A and 3B illustrate the relative locations of the buffer finger conveyors 22 of buffer modules 20 between conveyor rollers 14 and spaced upstanding bars 18 of the side rails 16. FIG. 3A shows this relative position in side elevation, and FIG. 3B shows this relative location in top plan.

Figure 4:
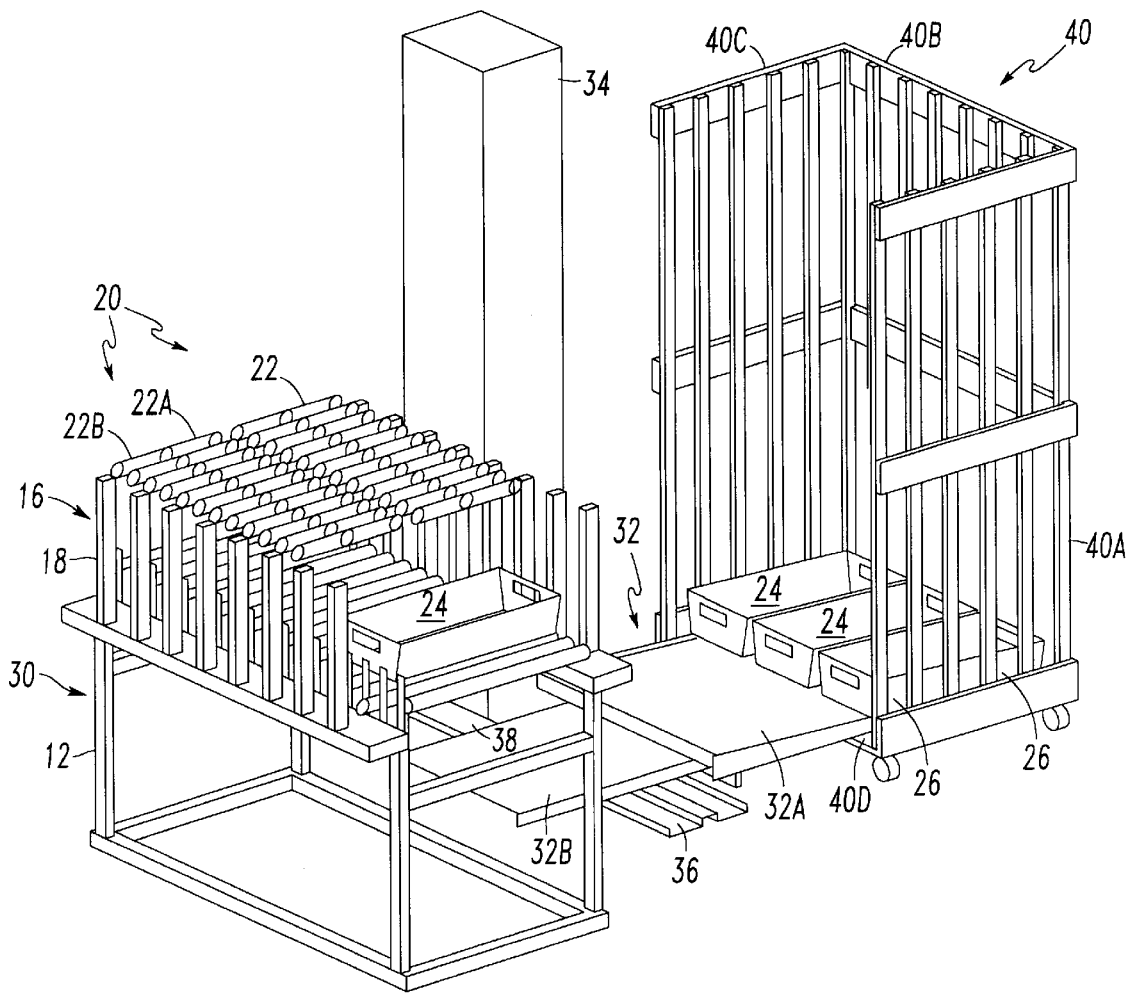
FIG. 4 is a similar perspective view to that of FIG. 3 showing the elevated position of the buffer fingers of an in-line buffer, and an extended lateral position of the loading manipulator platform, showing the completion of the transfer of a full layer of mail trays into the bottom of an APC.

Buffer modules 20 include shelf assemblies 21, each including four buffer finger conveyors 22. As illustrated in FIG. 4 each buffer finger 22 is a conveyor including a polycord belt 22B fed around a plurality of pulleys 22A. The outboard ends of each shelf assembly 20 are secured to a crossbar assembly 20A which is slidably mounted on vertical bars 18 on side rails 16. Vertical movement of crossbars 20A is achieved by pneumatic cylinders (not shown). Each shelf assembly 20 reaches approximately half-way across the top surface defined by the conveyor rollers 14. The shelf assemblies 21 in a normal or initial position are disposed below the top surface of rollers 14 in an interleaved manner illustrated in FIGS. 3A and 3B and once actuated extend to the upper positions illustrated in FIG. 4. The buffer shelf assemblies 21 are individually actuated in response to control signals from the central computer in order to selectively form predetermined patterns of mail trays on the combined top surfaces thereof. Once shelves of the buffer assemblies reach the position illustrated in FIG. 4 they are fully covered by a pattern of mail trays and drive power may be applied thereto to the polycord belts rotating thereon clockwise to eject a full layer of mail trays at a time onto the platform assembly 32 of the loading manipulator 30.

The rollers 14 of the conveyor modules 10 are connected to appropriate drive motors which rotate rollers 14 in order to transport the mail trays along the top horizontal surface defined by the juxtaposed rollers. The rollers and/or the associated frame of each module 10 also include appropriate sensors for determining the presence of mail trays such as 24, 26 thereon so that each tray as it moves along the conveyor system is tracked to determine its position in the system at any given time. This will be described more fully hereinafter with respect to the description of the system controls.

Figure 3:
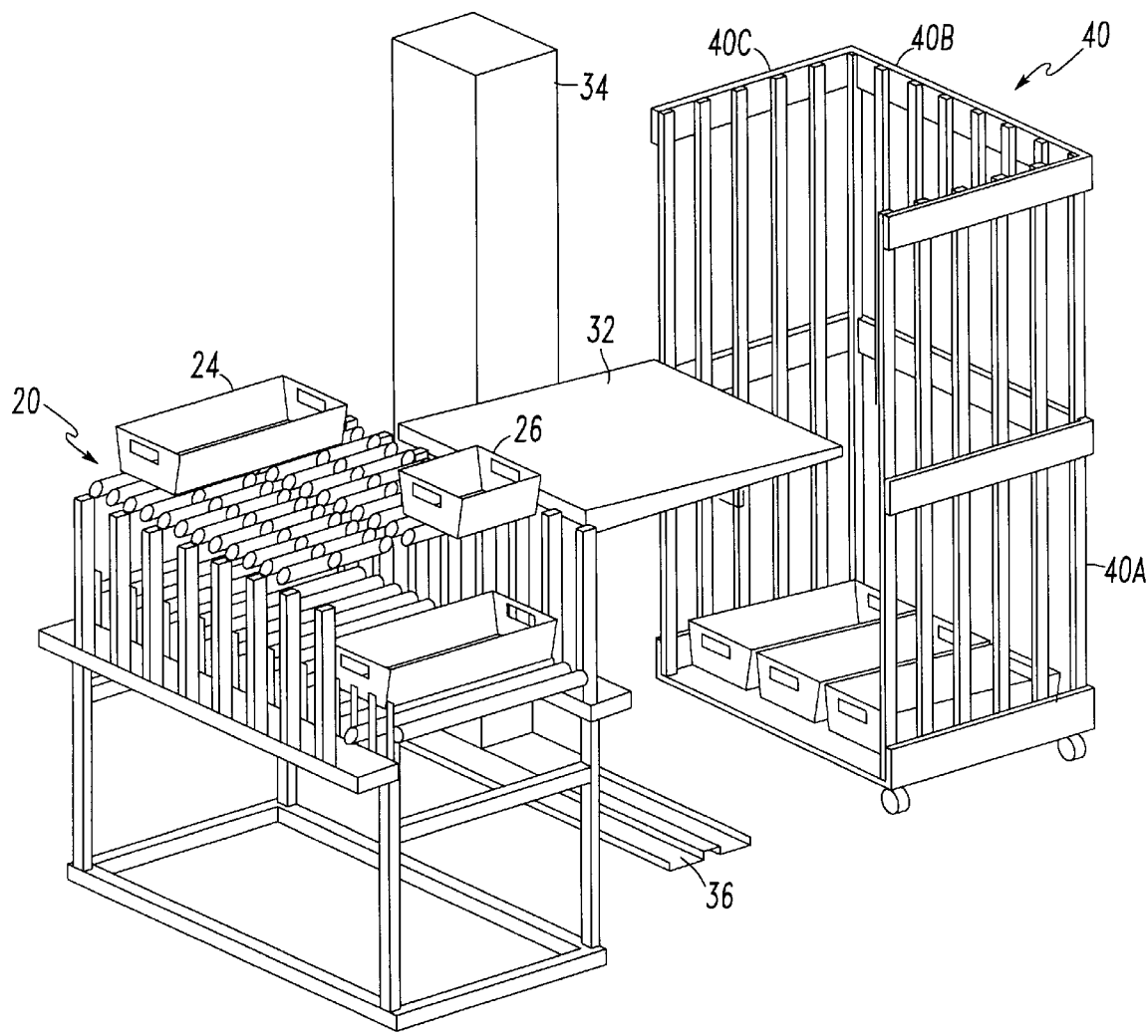
FIG. 3 is a perspective view of one of the in-line buffer modules, container loading manipulators and all purpose containers (APC) for use in the system of FIG. 1.

The details of the container loading manipulator 30 are illustrated in FIGS. 3 and 4. FIG. 3 illustrates the loading manipulator 30, as including a support post 34 longitudinally movable along a track 36, a platform 32 movable vertically, up and down post 34, on horizontal support arms 38 operatively connected for vertical movement on the post 34.

FIG. 3 illustrates loading manipulator platform 32 in an UP position in alignment with extended positions of a plurality of buffer shelf assemblies 21 and associated buffer finger conveyors 22. A mail tray 24 is illustrated as bridging across a pair of buffer fingers 22 extending from respective, opposite side rails of the conveyor module. This mail tray 24 is a full length mail tray, whereas mail tray 26 is a half-tray, which can be supported by a buffer shelf 21 extending from only one side of the modular conveyor side rails 16.

FIG. 4 illustrates in more detail the appearance of the buffer shelf assemblies 21 and finger conveyors 22 of an in-line buffer 20 by depicting buffer finger conveyors in a fully extended UP position. These fingers would be in this position just after a full layer of mail trays 24 and/or 26 had been supported thereon, and were then transferred by loading manipulator 30 to the positions shown in the bottom of all purpose container 40 to insert a layer of trays therein. It should also be noted that the loading manipulator platform 32 has two telescoping platform sections 32A and 32B so that the top platform section 32A can be extended into the open side of the all purpose container 40.

Typically all purpose container 40 has three sides formed by vertical rails 40A, 40B, 40C and the front side of the container is open for receipt of the mail trays. Containers 40 also have a bottom wall 40D which supports the bottom of a stack of containers 24, 26 loaded one layer at a time from the buffers assemblies 20 by the platform 32. Optionally, a middle shelf may be provided for stability and strength.

Figure 5:
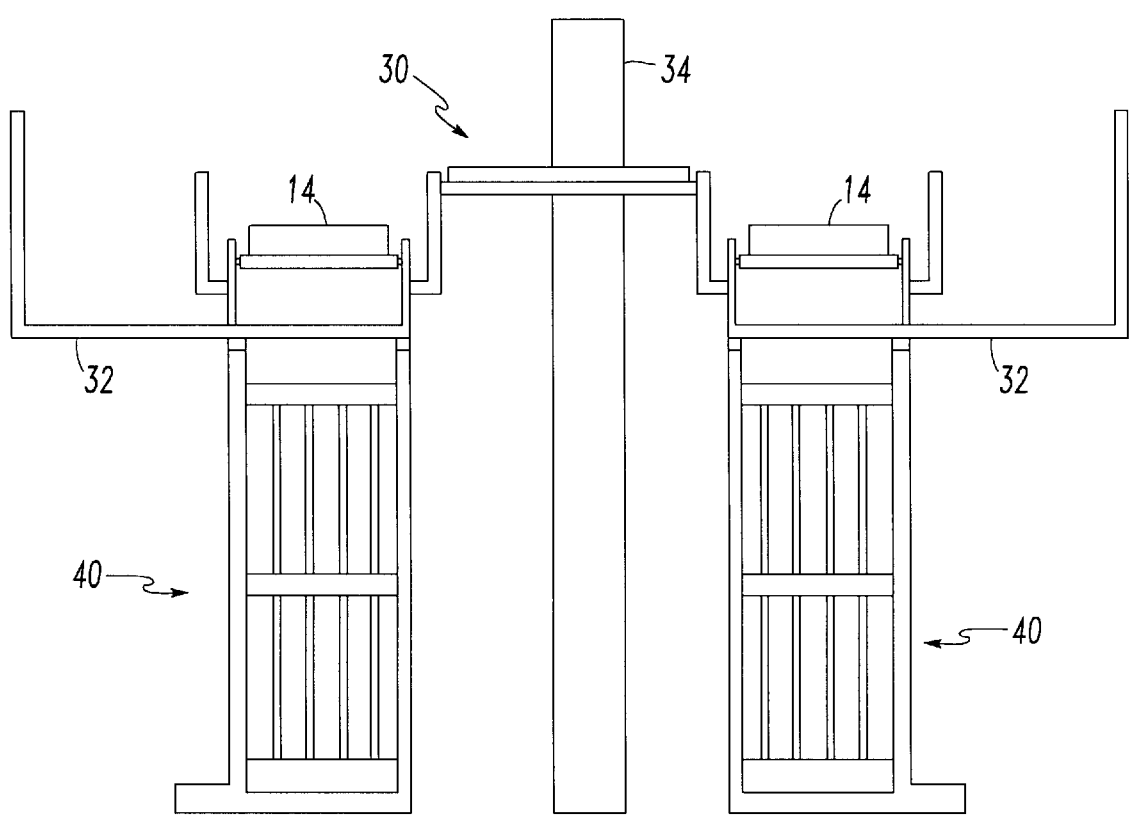
FIG. 5 is an alternative minimum footprint configuration of a conveyor system in accordance with the present invention illustrating a plurality of APCs on both sides of a central conveyor as an alternative to the single-sided arrangement shown in FIG. 1.

FIG. 4 illustrates a single-sided right handed transfer configuration. FIG. 5 illustrates a double-sided alternative with APCs 40 disposed below a pair of conveyor 10 with rollers 14. A single loading manipulator 30 with platform 32 serves the containers for both conveyors. The FIG. 5 embodiment provides a minimum footprint since containers 4 are disposed below the conveyors.

The operation of the automatic container loading system of the present invention will now be described in more detail in conjunction with the illustrations of FIGS. 6 and 7.

FIG. 6 shows the general layout and flow of the system. The simplest example is loading sleeved and strapped trays into an APC 40 illustrated as 40-1, 40-2, 40-3, 40-4 in FIG. 6 Trays 24 are stacked in columns corresponding to the designations A, B, and C.

Incoming trays 24 arrive from the facility on a conveyor system 42 The trays 24 are scanned by a reader 44, and are conveyed into the system through orientation module 50, or are rejected if the bar code on the tray 24 is unreadable, or the tray per se is out of scheme with acceptable container criteria. Rejected trays are placed onto a gravity roller conveyor 46 for manual processing The orientation module 50 may include protruding pins to block progress of a corner or other portion of a tray 24, causing the tray to rotate as the roller conveyor continues to run. This is one example of an orientation technique but other orientation devices of a robotic nature may be utilized in place of the protruding pins. However, for the purposes of illustration in FIG. 6 it should be assumed that the orientation module uses a plurality of pop-up pins that can be selectively fired to rotate the tray 24 right or left, or to pass the tray without rotation. In the example shown in FIG. 6 the pins will edge justify a moving tray 24 to either side of the belt conveyor for future alignment with a selected buffer shelf 21.

For trays 24 that enter the system through the orientation module 50, the type of pattern being constructed for the destination at a particular buffer assembly is determined; the tray 24 is conveyed to the appropriate buffer section and lifted from the conveyor. In the example of loading sleeved and strapped trays into an APC, trays are stacked in columns corresponding to the designations A, B, and C. In this example the first tray entering the system would be conveyed to a conveyor zone 1-2 shown in dotted lines. These two shelves 21 of conveyor zone 1-2 would lift the tray simultaneously into the buffer position in response to control signals from the central computer. Once this tray is raised to the buffer position, trays for other destinations can pass underneath it along the succession of conveyor modules 10. Each buffer can selectively remove trays from the flow of trays on the conveyor without blocking that flow. When the next tray is received for this designation, it would be placed in zone 3-4 indicated in dotted lines, and the final tray in the layer would be placed into zone 5-6. Once the entire layer is complete the container loader manipulator 30 removes the entire layer and places it into a container such as container 40-1 of FIG. 6.

For half-trays (½ MM or SMM) 26 buffer positions 7-8 can be used to group two half-trays 26 together. The first half-tray is conveyed to zone 8, and lifted into the buffer position by an associated buffer shelf 21. The next half-tray is conveyed to zone 7. The half-tray in buffer position 8 is then lowered creating a pair of half-trays that can be conveyed into one of the downstream zones.

For taller (EMM) trays a height sensor identifies EMM trays in reader 44. These trays can then be distributed among the stacked positions A, B, and C. For example on layer #1, positions A and B are EMM trays, and C is a standard tray (MM). On a layer #2 to be placed in an appropriate container 40, the first tray received is an EMM tray. It will be placed into position C to keep the stacked heights as even as possible.

Also as shown in FIG. 6, for example in container 40-3, the trays may be stacked as shown by pattern E, F, D wherein trays are oriented longitudinally of the conveyor in positions E and F and transversely of the conveyor in position D. This pattern is a modified brick-laying pattern which will now be described in more detail in connection with FIG. 7.

Open trays are preferably stacked in brick-laying patterns in either APCs or pallets in order to achieve a stable load that avoids some of the problems associated with nesting of partially filled trays. The brick-laying pattern is created with the orientation module 50 of the conveyor as described above. As an incoming tray is read by reader 44, its destination and the pattern for loading into an appropriate container 40, or a pallet associated with that destination, is determined. The brick-laid pattern for example may use the following buffer positions illustrated in dotted lines for odd and even layers:

Even layers: 1–3, 3–5, 4–6
Odd layers: 1–3, 2–4, 5–6

The brick-laid pattern is also preferably utilized to create stable stacks on pallets. The pallet bricklaid pattern is shown in FIG. 7. The brick-laid pattern will be created such that each pallet layer has two sections (sections 1 and 2 in FIG. 7) these sections include for section 1, four-tray sections and for section 2, and a two-tray section as follows:

Even layers:
  Section 1: 1–2, 3–5, 4–6, 7–8
  Section 2: 2–4, 6–8
Odd layers:
  Section 1: 2–4, 6–8
  Section 2: 1–2, 3–5, 4–6, 7–8

The logic that was used for positioning half-trays using zones 9 and 10 of FIG. 7 and distributing the position of EMM trays in the APCs can also be used on palettes to achieve more efficient sorting and greater stability of the resulting package.

In both FIGS. 6 and 7 the systems therein may also be provided with recirculation loops (not shown). The recirculation loop may consist of a return conveyor that runs over top of the buffer conveyor. If a buffer position is full, the recirculation loop will allow trays to pass by the destination buffer and recirculate to the input conveyor 42 rather than blocking the buffer conveyor until the buffer is empty.

Figure 8:
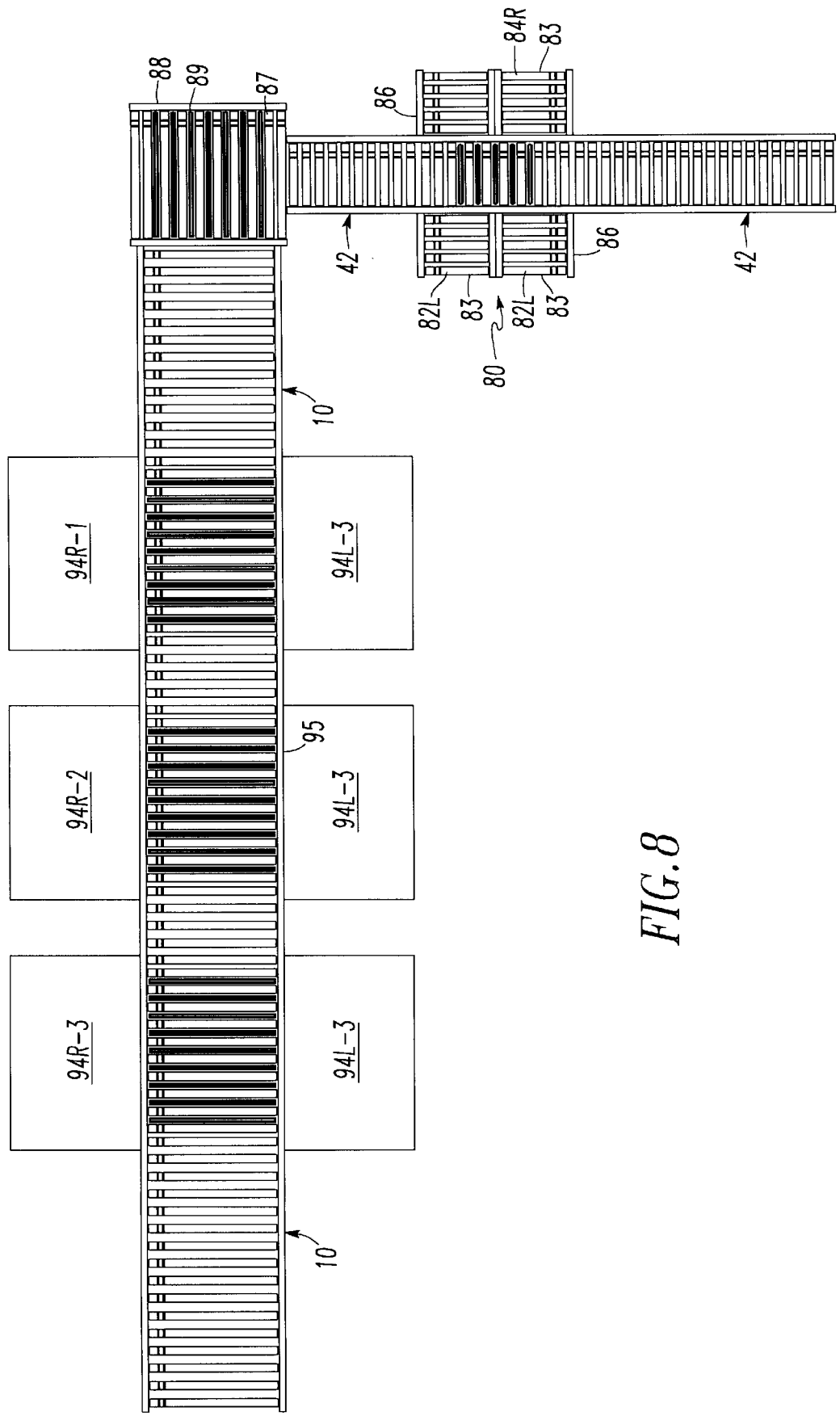
FIG. 8 is a top plan view of a second embodiment of in-line buffer modules according to the present invention.

FIG. 8 illustrates a second embodiment of in-line buffer modules suitable for use in the automatic container loading system of the present invention (RCS) An input conveyor 42 transports incoming mail trays to a preliminary buffer station 80. Buffer station 80 provides the capability of performing a preliminary sorting and buffering of half-trays (½ MM or SMM) according to a preselected criteria input into the central processing unit. The buffering unit 80 includes a first pair of buffer wing assemblies 82L on the left side of the inbound conveyor 42 and a second pair of wing buffer assemblies 84R on the right side of the inbound conveyor. Each of the buffer wing assemblies is provided with a plurality of unpowered letter rollers 83 so that a tray moved onto the top surfaces of these rollers will freely move in response to a lateral force applied thereto. A conveyor belt assembly 86 is disposed between the wing buffer assemblies for transferring mail trays selectively onto the wing buffer assemblies. This transfer conveyor belt assembly 86 includes five polycord belts disposed between the rollers of the inbound conveyor 42. These polycord belts are provided with drive means (not shown) which rotate them about associated pulleys, in order to transfer trays to the right or left selectively in response to control signals. In addition before transferring trays laterally the belts of the transfer conveyor assembly 86, which are mounted on an elevator mechanism (not shown for clarity), raise the belts above the top surface of the rollers of conveyor 42 prior to applying the drive force which rotates the belts and laterally moves the trays to the destinations on the wing buffer assemblies 82, 84.

Full trays—(MM) and (EMM)—which are not buffered at station 80 continue on conveyor 42 until they reach a station including orientation module 88. In this embodiment orientation module 88 includes pairs of gripper arms illustrated in FIG. 10 to be described hereinafter. The orientation module of FIG. 8 includes a rectangular platform having a series of polycord conveyor belts 89 interleaved between powered transport rollers 87. Trays arriving at orientation module 88 either exit, as is, or are turned to the proper orientations by gripper arms 53 which caress the trays and rotate them to proper orientations, in order to achieve selected patterns (such as brick-laid) downstream at an appropriate one of the respective in-line buffer assemblies.

If a tray arriving from conveyor 42 onto rollers 87 is already oriented transversely of conveyor 10, when it reaches the center point of rollers 87, belts 89 will be raised above rollers 87 to lift the tray. Belts 89 will then be rotated to the left to transfer the tray to conveyor 10 on which it will proceed with its longitudinal axis at right angles to the axis of conveyor 10. In this position it may be transferred longitudinally into a selected buffer storage wing. However, if a tray entering rollers 87 is to be oriented 90° from a normal tray position, such as when forming part of a brick-laid pattern, it will be carried by gripper arms 53 and rotated 90°. Belts 89 will then raise up and rotate to transfer the tray to conveyor 10.

Figure 10:
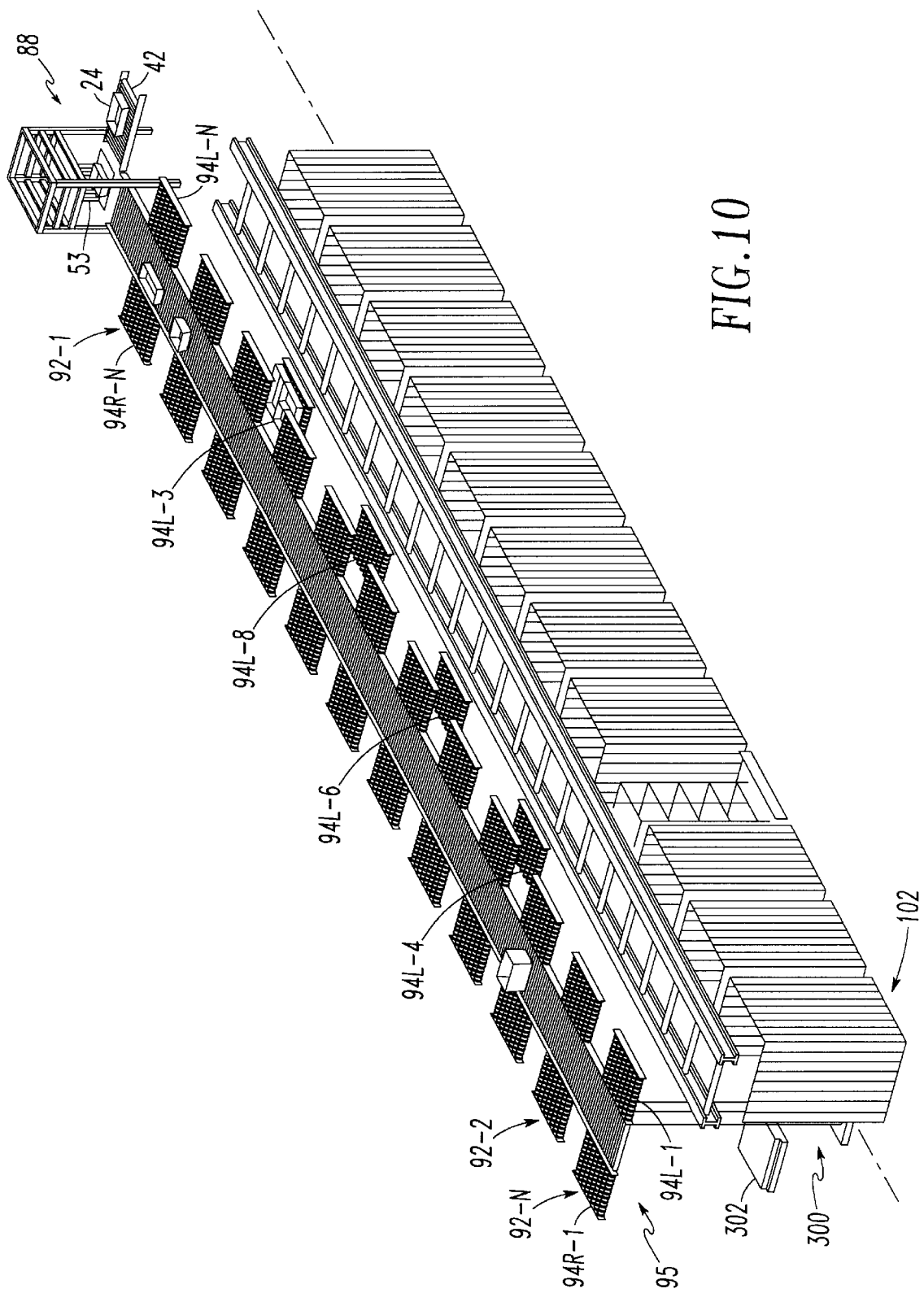
FIG. 10 is a perspective view of a more complete system utilizing the second embodiment of the invention of FIG. 8.

The in-line buffer assemblies of this embodiment of the present invention are located downstream of the orientation module 88. In FIG. 8, three in-line buffer sections are illustrated for clarity but in a typical installation a larger number of in-line buffer sections would be provided, such as illustrated in FIG. 10 to be described. The buffer modules are designated 92-1, 92-2, and 92-3. Each of these modules includes a pair of buffer wings similar to buffer wings 82L and 84R associated with the input conveyor 42, but larger in order to accommodate various packaging patterns. The buffer wings of in-line buffer section 92-1 are designated 94L-1 and 94R-1 to represent the buffer wings on the left and right sides of the conveyor, respectively. Likewise the buffer wings of section 92-2 are designated 94L-2 and 94R-2. Also the buffer wings of in-line buffer section 92-3 are designated 94L-3 and 94R-3 for the respective left and right wings.

Each of the in-line buffer sections 92-1, etc. are provided with a plurality of transfer conveyor belts 95. In the embodiment shown in FIG. 8, these conveyor belts 95 are 13 in number. These conveyor belts are selectively elevated in groups by elevator mechanisms (not shown for clarity) in response to control signals from the central processing unit. Once elevated above the adjacent rollers of conveyor 10, the belts are rotated either right or left in order to transfer trays to selected wings of the buffer assemblies. In this embodiment of the buffer assemblies trays are transferred one at a time into the respective side wings. Once the individual trays are transferred, they S are formed into groups of full layers on the respective wings include idler rollers 97.

Figure 9:
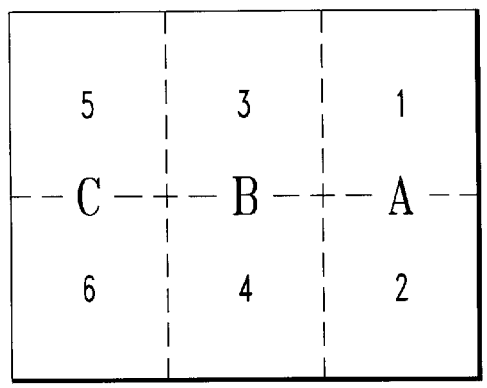
FIG. 9 is a top plan, diagrammatic, view of buffer zones on the buffer wing assemblies of the system of FIG. 13.
Figure 9A:
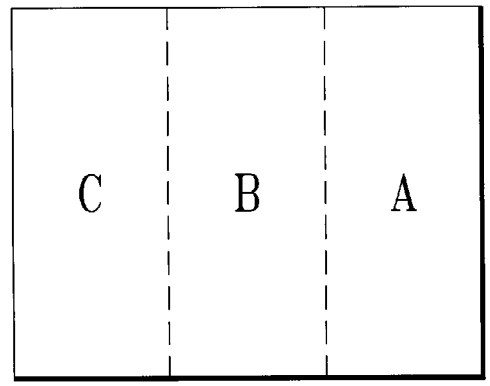
FIG. 9A is an illustration of a tray stacking pattern for columns of trays to be inserted into all purpose containers.

The idler rollers 97 of the respective wing sections such as 94L-1 and 94R-1 for example may be divided into buffer zones 1 to 6 separated into three (3) channels such as illustrated in FIG. 9. These zones provide the ability to achieve packaging patterns such as illustrated in FIG. 9A for packages with three (3) columns A, B, C, or a brick-laid pattern with columns E, F, D illustrated in FIG. 9B. More specifically, to achieve the package configuration with columns A, B, C, of FIG. 9A, a tray for column A in a buffer wing such as 94L-1 would occupy zones 1–2 on the idler rollers 97; a tray for column B would occupy zones 3–4; and a tray for column C would occupy zones 5–6.

Figure 9B:
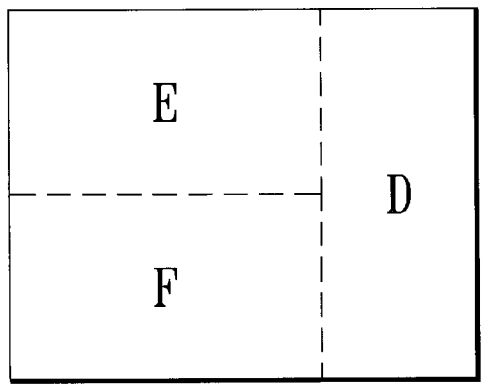
FIG. 9B is an illustration of a brick-laid stacking pattern of columns of trays to be placed into all purpose containers or stack on pallets.

In order to achieve a brick-laid pattern, some trays are rotated 90 degrees by the orientation module 88 in order to achieve the configuration illustrated in FIG. 9B. In this configuration a tray for column E would occupy zones 3–5; a tray for column F zones 6–4; and a tray for column D zones 1–2.

Figure 9C:
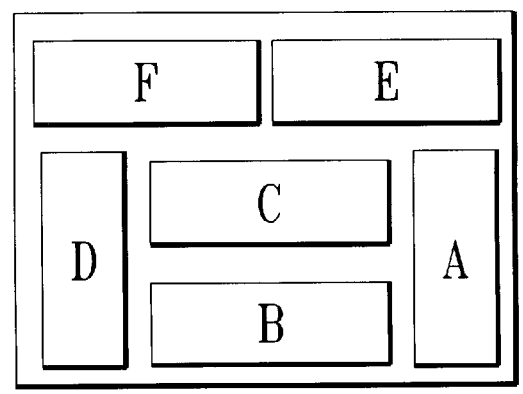
FIG. 9C is an illustration of a more complete brick-laid pattern for transfer to pallets.

A more complete brick-laid pattern for pallets could be achieved as illustrated in FIG. 9C by providing eight buffer zones laterally across skate rollers 97 in the buffer wing assemblies. In the alternative, using (6) zones the pallet could be presented to the buffer wing with its longest dimension perpendicular to the wing.

The delineation of zones such as 1 to 6 in FIG. 9, or 1 to 8 as could be used to achieve the full brick-laid pattern of FIG. 10, are controlled by the grouping the actuation of selected ones the 13 belt conveyors 95 in each of the in-line buffer modules. That is, the buffer conveyors 95 are actuated in selected groups according to control signals consistent with the package pattern criteria input into the central processing unit. Accordingly, the conveyor belts 95 may be grouped with respect to their actuation in correspondence to the zones required on the wing buffer assemblies to achieve the respective package layer criteria illustrated in FIGS. 9A to 9C.

In the alternative all belts 95 operate in unison and trays are simply stopped over certain belts aligned with desired zones in the wings.

A more complete system utilizing the in-line buffer modules 92 of FIG. 8 is illustrated in the perspective view of FIG. 10. In that figure buffer modules 92-1 to 92-N are illustrated with mail trays moving along conveyor sections 10. The formation of a complete layer of trays is illustrated on the wing buffer assembly 94L-3. As illustrated when a complete layer of trays 24 is formed on a given wing buffer assembly, that wing buffer assembly is lowered by the depth of one layer in preparation for transfer of that layer of trays to an adjacent container 40. Alternatively, the wing 94 is held stationary and the container or pallet is moved up and down to permit direct lateral transfer by the loading manipulator.

Transfer of this layer of trays is achieved by a loading manipulator 96 mounted beneath the conveyor 10 and movable longitudinally thereof on a track (not shown). The loading manipulator includes a central post 100 and a shelf assembly 98 including telescoping top and bottom sections 98A and 98B. The operation of this loading manipulator is generally similar to loading manipulator 30 described hereinbefore with reference to the embodiment of FIGS. 1 to 7. That is, it moves longitudinally up and down the conveyor line in response to control signals from the central processing unit to unload full layers of trays such as at buffer wing assembly 94L-3 into the opposed all purpose container 40. In doing this the top shelf of the shelf assembly 98A extends to meet the buffer; and the layer of trays is edge-justified and pushed on the lower shelf of the manipulator end effector.

The end effector lowers the layer to the correct insertion height and inserts them into an open end of the adjacent container 40 much like a spatula. The end effector is then pulled out from under the trays leaving them neatly stacked within the container 40. Further details of the end effector are described in connection with FIG. 21.

Also illustrated in FIG. 10 is a plurality of safety curtains 102 disposed around the containers 40 in order to protect factory workers from injury. In the illustration of FIG. 10 a left bank of containers 40 on the other side of conveyor 10 is omitted for clarity. However, it can be seen that the loading manipulator 96 can transfer layers of trays assembled on the respective right and left wings of the buffer assemblies to containers 40 on both sides of the conveyor 10 since the loading manipulator 96 moves beneath the longitudinal access of conveyor 10.

Figure 18:
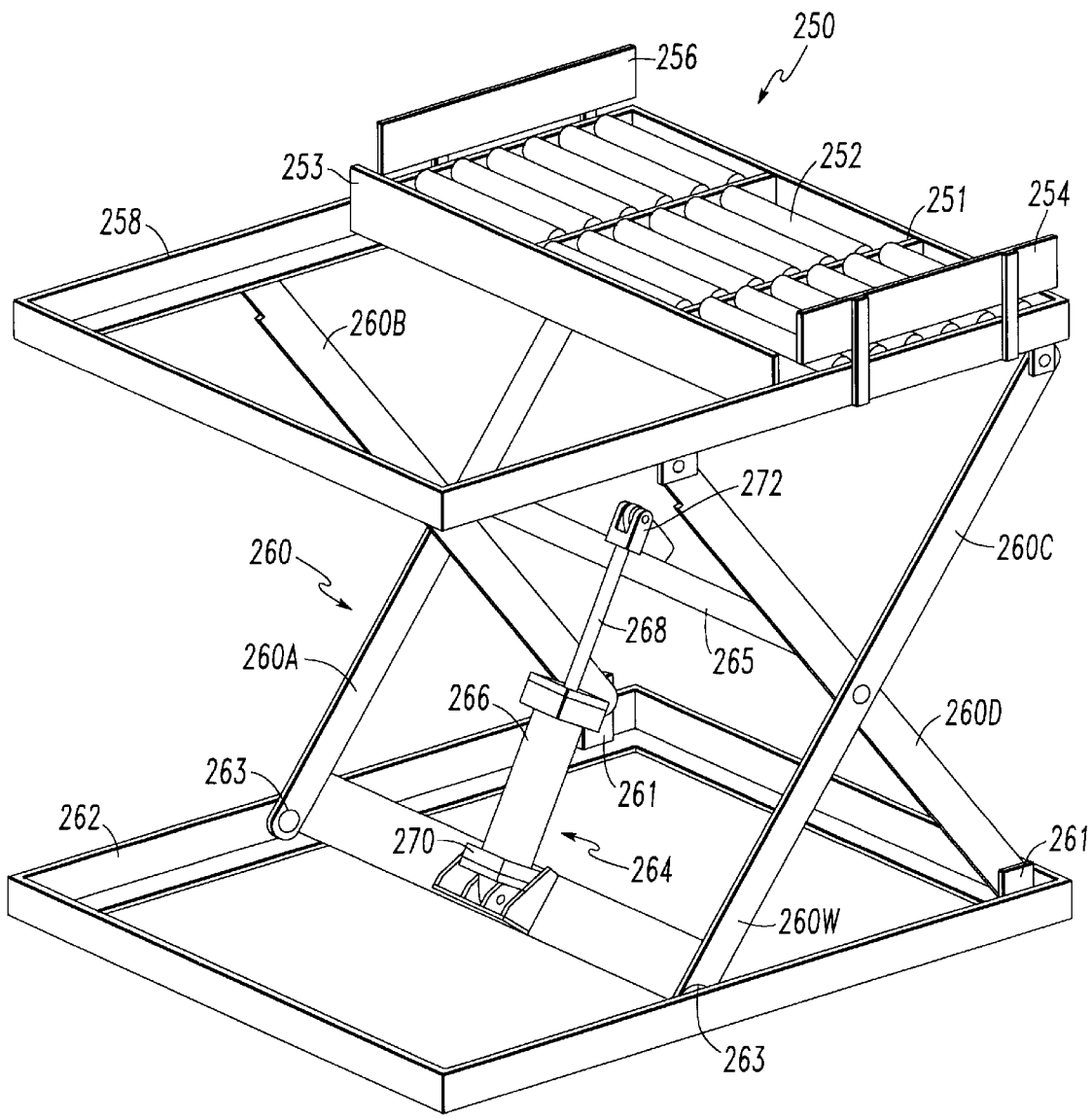
FIG. 18 is a perspective view of a preferred embodiment of a buffer wing assembly suitable for use in the systems of FIGS. 10, 19 and 20 of the present invention.

A preferred embodiment of a buffer-wing assembly 250 is illustrated in FIG. 18. This assembly includes a top rectangular frame 258 having an open side for interfacing with the lower section of the loading manipulator. A tray storage section, includes a plurality of idler rollers 252 journaled at their ends in a plurality of transverse supports. The top frame 258 is divided into the two respective sections by a transverse plate 253, which functions as an indexing stop for the lower telescoping section of the end effector to be described more fully hereinafter with reference to FIG. 21.

The buffer wing section, including idler rollers 252 is provided with a stationary edge-justifying, alignment, plate 256 at one end and a movable compression plate 254 at an opposite end. Plate 254 is movable across the longitudinal dimension of roller 252 toward stationary plate 256 by a pneumatic actuator (not shown) disposed beneath rollers 252.

The top frame 258 is supported by a scissors assembly 260, including scissor arms 260A, 260B and 260C, 260D connected to the respective side channels of frame 268. A bottom frame 262 with side channels 263 supports the bottom of the scissor arms. Scissor arms 260B and 260D are fixedly secured in the corners at one end of frame 262 at 261. scissor arms 260A, 260C have rollers 260W on the bottom thereof, which roll in the L-shaped side channels 263 as the buffer wing assembly is raised and lowered.

The scissors assembly is raised and lowered by pneumatic actuator 264, which includes a cylinder 266 and reciprocating actuator shaft 268 coupled to a cross-bar 265 connecting the scissors' arms at the cross-connecting pivot points thereof.

The buffer wing assembly functions as a staging platform that accepts the trays from the transport conveyor, forms a layer, and presents the layer to the loading manipulator 300, to be described in more detail hereinafter. The cell control computer sort plan determines the proper tray location within a layer, and instructs the transport conveyor to eject the appropriate tray in the proper position (to satisfy either column or brick layer patterns) onto a designated buffer wing, such as illustrated in FIG. 18. Once the wing has the proper trays assembled in a complete layer, a pneumatically activated compression mechanism pushes the trays sideways along the buffer width moving compression plate 254 towards stationary edge justifying plate 256. As the trays are pushed against plate 256, they become edge-justified for retrieval by the end effector of the loading manipulator 300. The buffer wing then rapidly lowers by contraction of the actuator rod 268 in cylinder 266 to pivot the scissor arms, which move the frame 258 to the correct height for transfer of the layer of trays to the loading manipulator 300. After the manipulator 300 retrieves the layer of trays, the buffer wing assembly 250 raises back to the level of the transport conveyor to receive new trays.

Figure 20:
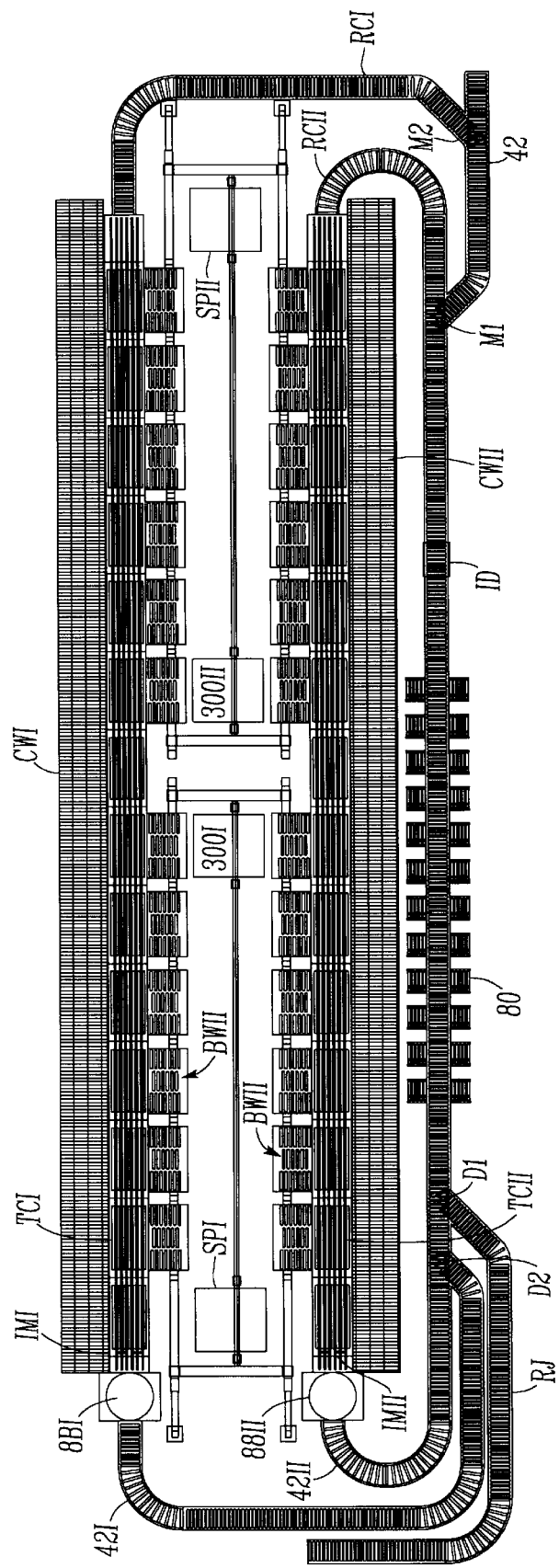
FIG. 20 is a top-plan view showing two transport conveyors of the type utilized in the system of FIG. 19 with parallel longitudinal axes and facing, co-planar-buffer wings on opposite sides of a loading manipulator.
Figure 21:
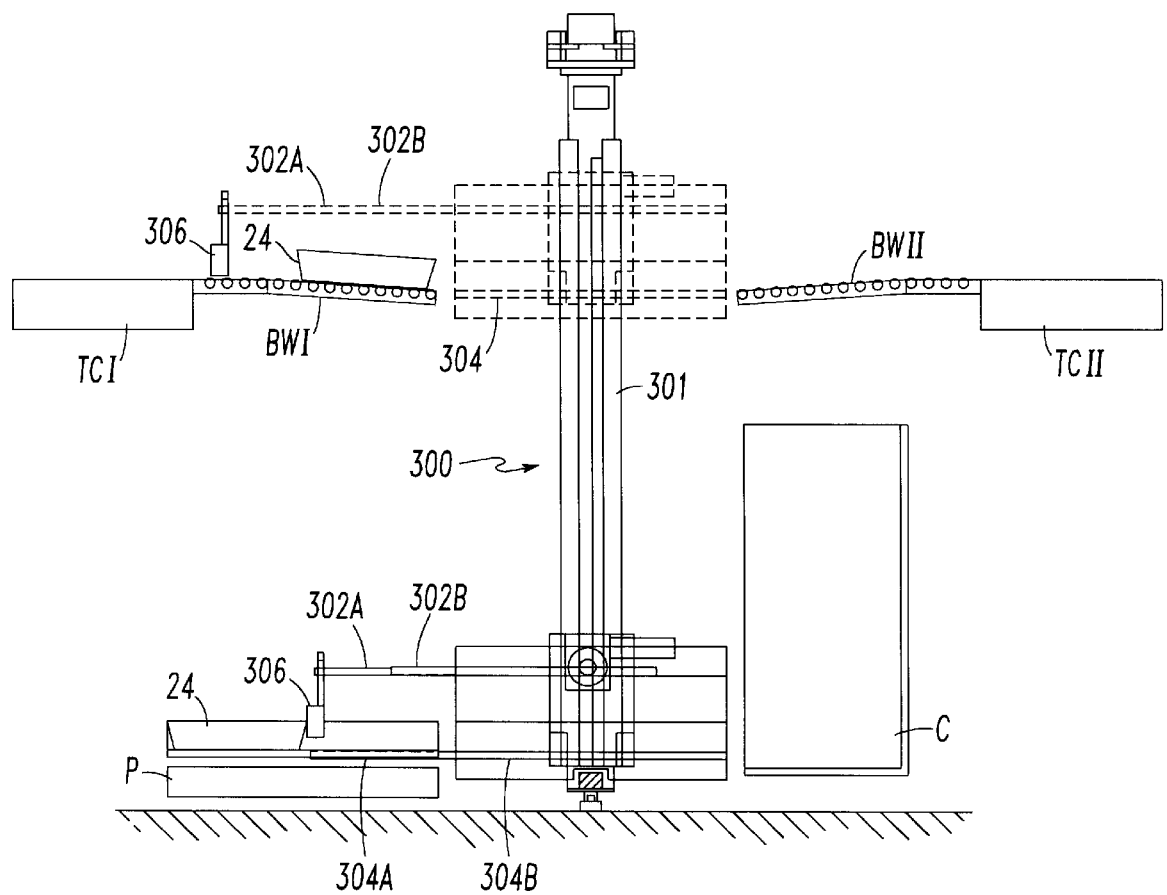
FIG. 21 is an end elevational view of a container loading system of the present invention such as depicted in FIG. 19 showing the details of a loading manipulator and end effector assembly in a preferred embodiment of the present invention.

Further details of the loading manipulator are illustrated in the end elevational view of the conveyor system depicted in FIG. 21. The manipulator 300 is located beneath the transport conveyors, such as TCI and TCII, which may be for the sake of explanation, the pair of parallel transport conveyors provided in a fourth embodiment of the invention depicted in FIG. 20. The manipulator 300 moves longitudinally on a track in a manipulator aisle disposed between the respective transport conveyors. The manipulator 300 utilizes a telescoping end effector mounted on a raise/lower axis to interface with each buffer wing 250, in order to retrieve single layers of trays and load them into containers on either side of the manipulator aisle. The end effector consists of a bottom extensible shelf 304, and a separately operated top extensible shelf 302 with a rotating sweep gate 306 mounted thereon. The bottom shelf 304 of the end effector extends to meet the buffer wing and indexes on transverse plate 256, while the top portion 302 of the end effector reaches over the top layer of trays on rollers 252, deploys sweep gate 306, and sweeps/rakes the layer of trays onto the bottom telescopic section 304, which provides a shelf for supporting the trays. Both the top and bottom portions of the extensible end effector retract, end effector is then lowered into the correct position for inserting the trays into an appropriate container or pallet 40. Once in position, the bottom shelf 304 of the end effector with the layer of trays thereon extends the proper distance into the container or over the pallet. That is, as illustrated in FIG. 21 the telescopic section 304A of the bottom section extends outwardly from telescopic section 304B into the container C, or into the region above a pallet P, for unloading of the trays onto those devices. The top portion 302 of the end effector is extended by telescoping its respective sections 302A and 302B, and the sweep gate 306 is deployed up against the layer of trays so that the layer cannot be retracted from the container or pallet. The extensible bottom shelf 304A, is then retracted thereby depositing the layer of trays in the container or on the pallet. The sweep gate 306 is then rotated out of contact with the trays leaving the layer of trays in position as the top end effector 302 is retracted.

Figure 22:
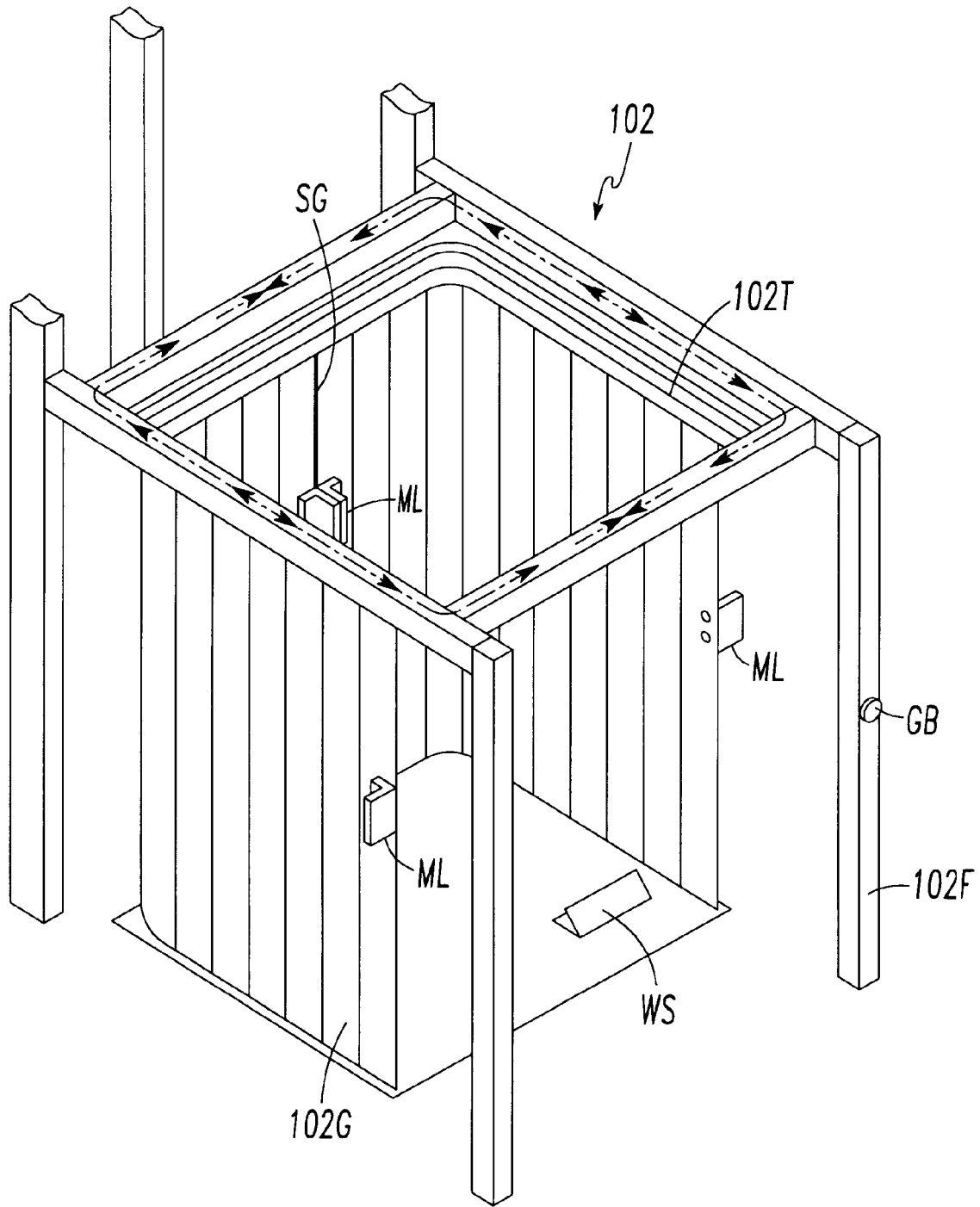
FIG. 22 is a perspective view of a preferred embodiment of a safety curtain assembly of the present invention suitable for use with any of the system embodiments described herein.

Details of a safety curtain system 102 for use with the robotic containerization systems of the present invention are depicted in FIG. 22. This safety curtain system offers continued operation of the robotic work cell while manually attending one or more loading positions. The safety curtain assembly 102 includes a movable, steel slat curtain 102C that surrounds each individual loading station on three sides forming a "U". This "U" is defined within a rectangular frame assembly 102F having a track 102T extending around the perimeter thereof at the top of the frame. The safety curtain 102C includes a plurality of hinged vertical slats having slider assemblies, such as rollers, hooks or the like, on the top ends thereof mounted for slidable movement within the track 102T. During robotic loading, the open side of the "U" is facing the manipulator 300 providing access for loading layers of trays into the container and prohibiting manual entry into the loading cell. See for example, the closed condition of all but one of the cells illustrated in the system of FIG. 19. When a container/pallet is to be removed, the curtain 102C is reoriented to where the open side of the "U" faces away from the manipulator 300. See for example, the single open cell illustrated in the FIG. 19 system. In this orientation, the safety curtain 102C blocks manipulator access to the loading cell, and allows, safe, manual access by a postal worker to remove the container/pallet. This "U"

arrangement on each loading station offers the benefit of uninterrupted robotic loading operations while removing/ replacing full containers manually. The safety curtain design mutually excludes interaction between the postal operator and the manipulator 300 at all times.

Slats 102C may be split into two sections at split gate SG. Magnetic locks ML connect the two sections at SG. Magnetic locks also connect like rear ends of curtain 102C to frame 102F. A gate button GB may be provided to release the magnetic locks.

Figure 19:
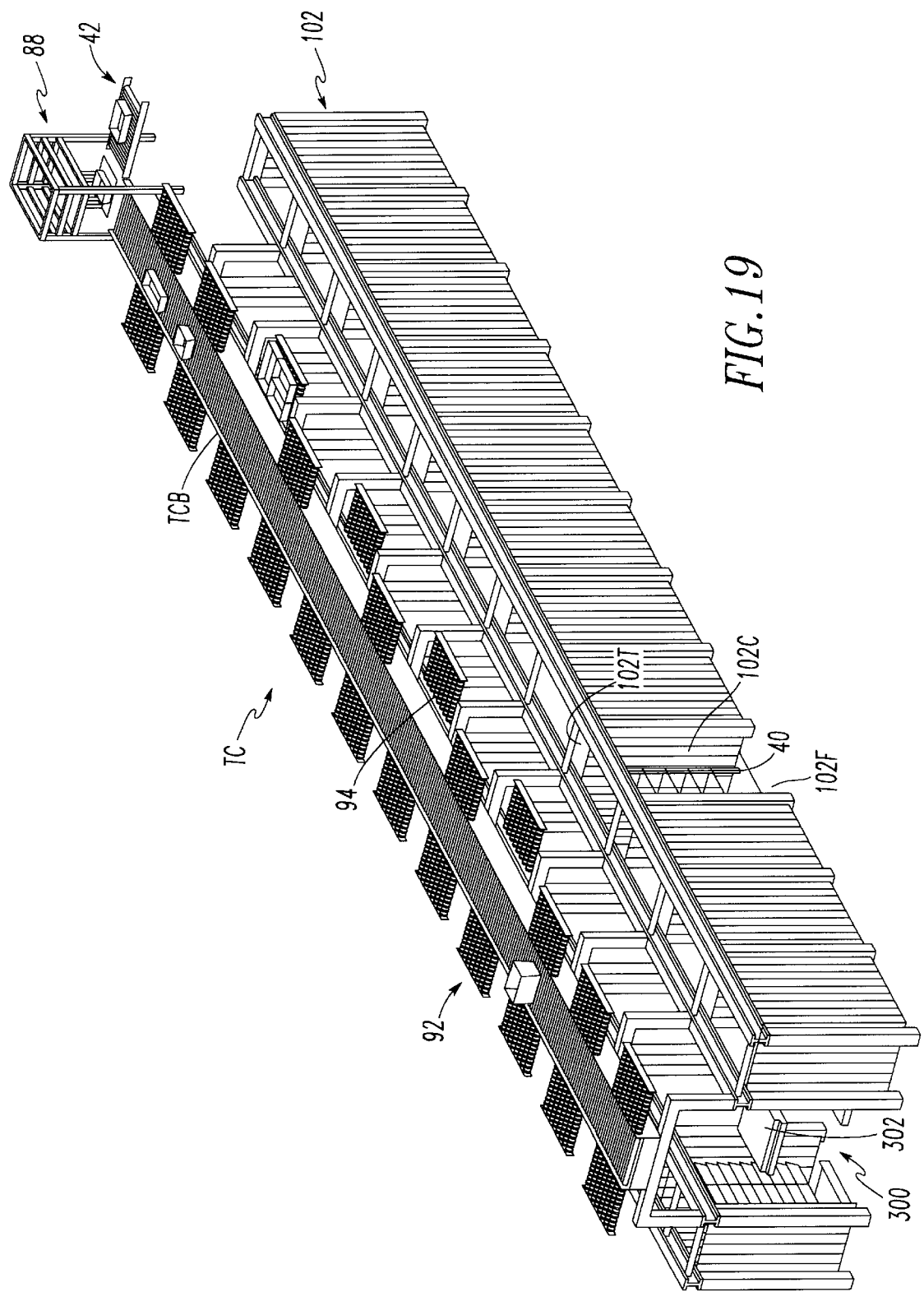
FIG. 19 is a diagrammatic illustration depicting a third embodiment of the present invention generally similar to the embodiment of FIG. 10, but utilizing conveyor belts for the transport conveyor, rather than the powered rollers of FIG. 10.

Referring now in detail to a third embodiment of the present invention illustrated in FIG. 19, which utilizes conveyor belts for the transport conveyor rather than power rollers as in the FIG. 10 embodiment, there is illustrated a transport conveyor TC with a plurality of parallel transport conveyor belts TCB extending along the longitudinal axis of the transport conveyor. Mail trays are conveyed on inbound conveyor 42 into an orientation module 88, such as described hereinbefore with reference to the system of FIG. 10. The orientation module 88 rotates the trays in the proper direction, if necessary, in order to achieve column or bricklaid patterns. The trays are discharged from the orientation module 88 for appropriate orientation for loading into a container. The trays are fed from the orientation module 88 onto the transport conveyor TC through an induction module IM, including a series of sensors A, which fix the point in time at which each tray enters the transport conveyor and sends appropriate signals to the cell control computer. Upon crossing a transverse area of sensors S imbedded in the induction module IM at the entrance to the transport conveyor TC, trays are inducted into the transport/sorting conveyor cell control computer. The transport conveyor moves the trays, feeds and sorts them according to the destination codes thereon onto a series of buffer wings 92, 94 disposed on the respective sides of the transport conveyor The buffer wings 92, 94 temporarily store the trays until a complete layer is assembled therein for subsequent transfer to appropriate containers or pallets.

The cell control computer tracks the progression of the trays through the use of a shaft encoder SE operatively connected to the drive mechanism of the conveyor belts, as illustrated in FIGS. 20H and 20I to be described hereinafter. Individual trays are ejected at right angles to the transport conveyor onto the desired buffer wings 92, 94 in proper orientations and positions. When the buffer wings 92, 94 have sufficient numbers of trays for a complete layer, the wing lowers and compresses the trays for transfer to a manipulator 300 in a manner described hereinbefore with reference to FIG. 18. The manipulator 300 with the extensible end effector 302, 304, described hereinbefore with reference to FIG. 21, retrieves the layer of trays from the lower buffer wing. The buffer wing then elevates back into normal position in the plane of the transport conveyor in order to accept additional trays. The manipulator 300 then lowers and deposits the layer of trays into the corresponding container or pallet.

In the embodiment of FIG. 19, the transport conveyor is a multi-belt conveyor design for transporting trays and utilizes a series of pop-up ejection rollers PR mounted at the location of each pair of buffer wings to eject the trays at right angles to the main transport axis of the conveyor TC onto the wings. The multi-belt conveyor consists of a series of small belt strips TCB spaced apart such that the powered rollers PR are nested between each belt and are normally below the conveying surface of the belts to allow the trays above to pass. As the tray travels along the multi-belt conveyor, the powered rollers PR are air actuated to an elevated position (higher than the surface of the belts) and an electric motor EM powering the rollers is driven either clockwise or counterclockwise to transfer the mail tray to the left or right buffer wing 92, 94 at the appropriate time. The powered rollers are then retracted to the down position to allow additional trays to pass above. The respective up and down positions of the powered rollers with respect to the belts TCB is depicted in FIGS. 19A and 19B.

Figure 19A:
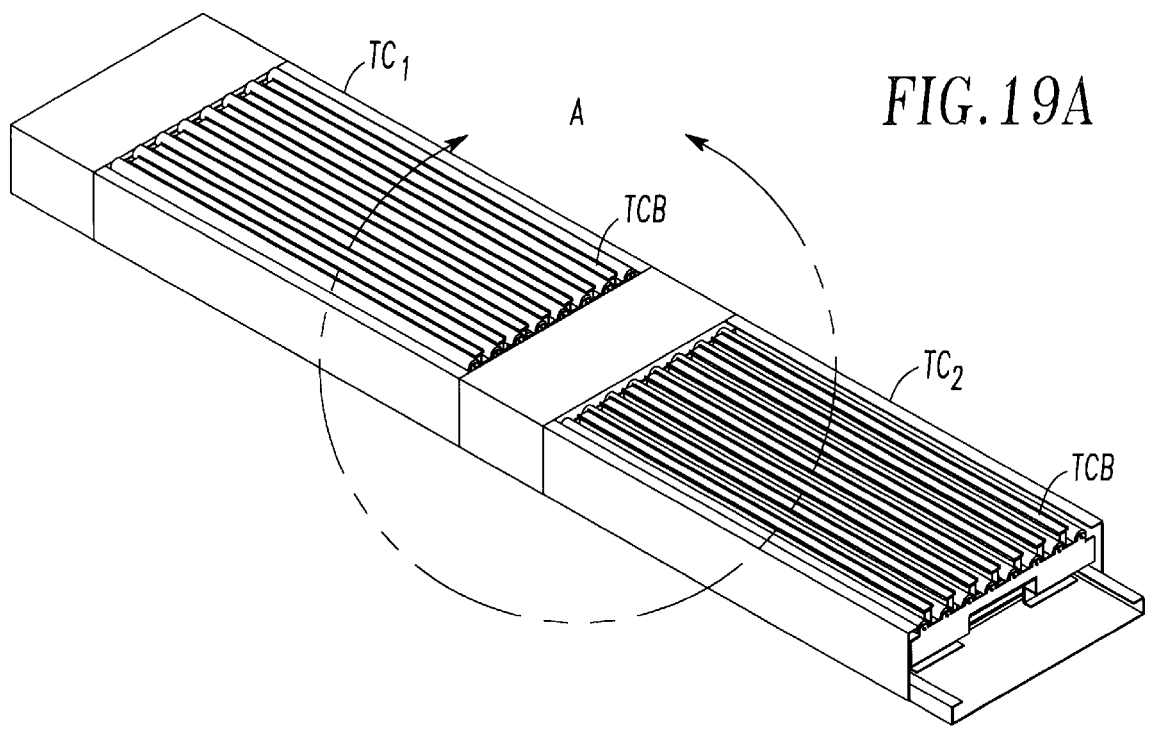
FIG. 19A is a perspective view of two end-to-end sections of the belt conveyor of FIG. 19.
Figure 19B:
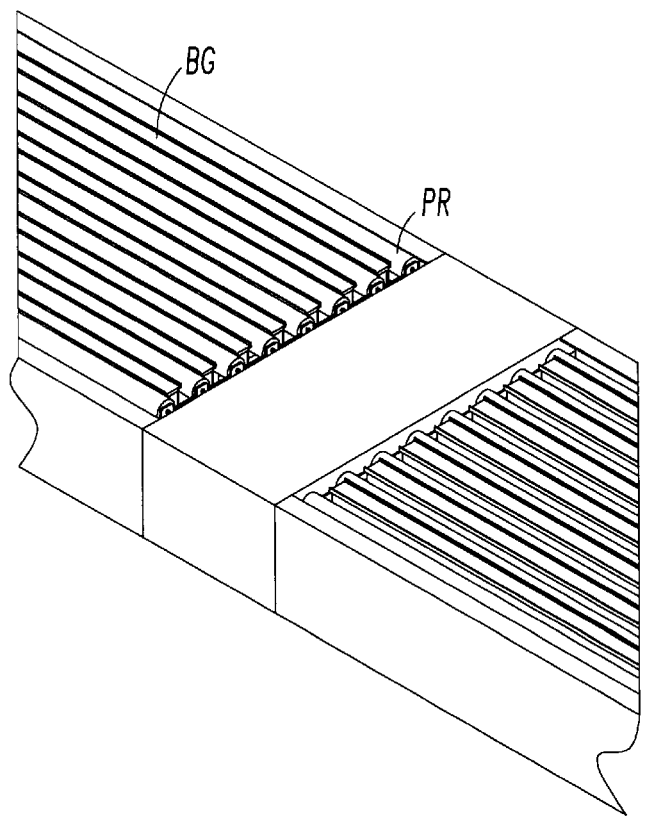
FIG. 19B is a partial enlarged view of detail "A" of FIG. 19A depicting the support structure for the conveyor belts and relative location of the ejection rollers.

FIGS. 19A–19E illustrate, in detail, the mechanism for activating ejection rollers PR to selectively transfer trays to the buffer wings. FIG. 19A depicts two conveyor sections $TC_1$; $TC_2$ disposed end-to-end with the plurality of spaced, parallel, conveyor belts TCB. FIG. 19B is an enlarged view of detail "A" of FIG. 19A illustrating the two conveyor sections with the belts TCB removed in order to illustrate parallel belt guides BG, which are disposed below each belt to guide the same longitudinally of the conveyor sections as they move therealong. Also, illustrated more clearly in FIG. 19B are ejection rollers PR disposed between each of the belt guides BG.

Figure 19C:
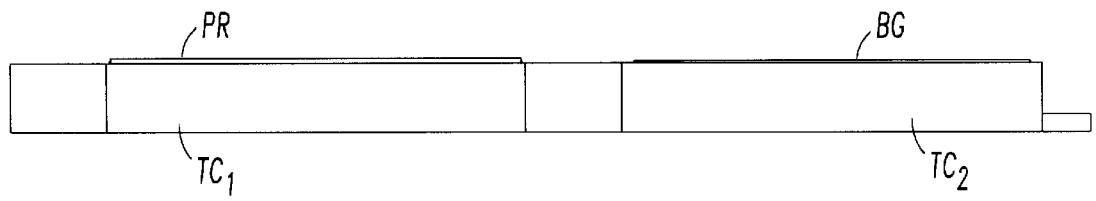
FIG. 19C is a side elevational view of two sections of a transport conveyor according to FIG. 19A showing the transfer rollers in a down, retracted, position; on the right section and the transfer rollers up in the left section.
Figure 19D:
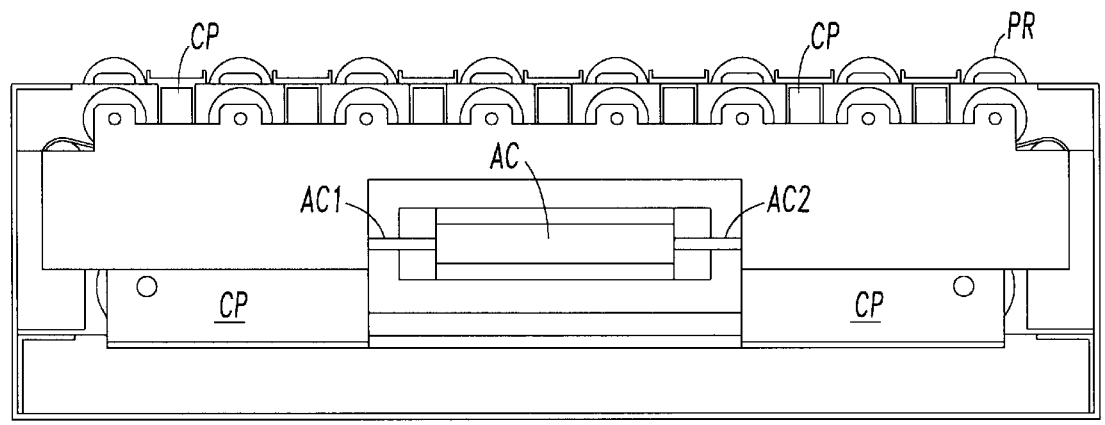
FIG. 19D is an end elevational view of the conveyor sections of FIG. 19A depicting the ejection rollers at the near end section down, and the far end section up.

FIG. 19C is a side elevational view of the conveyor section $TC_1$, $TC_2$ of FIG. 19A illustrating the rollers PR in section $TC_1$ in an up position where they extend slightly above the level of the belt guides BG, and the rollers PR in the down position in section $TC_2$ where they are obscured from view by the belt guides BG. Another illustration of the up and down position of the respective rollers PR is illustrated in the end elevational view of FIG. 19D.

Figure 19E:
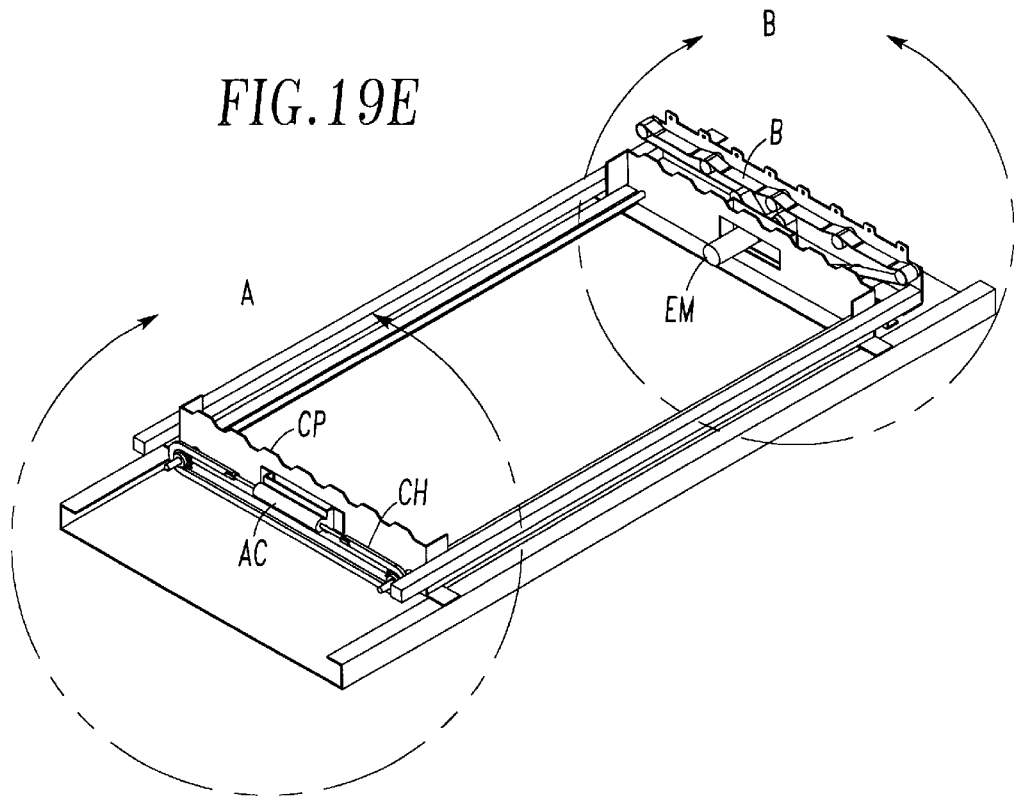
FIG. 19E is a partial perspective view of the conveyor structure of FIG. 19A with the conveyor belts and ejection rollers removed to depict the actuation mechanisms for the ejection rollers.
Figure 19F:
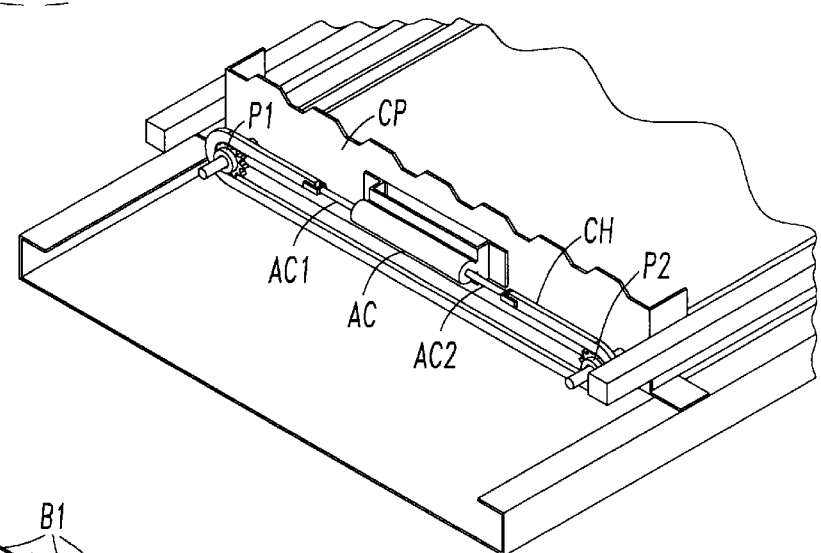
FIG. 19F is an enlarged perspective view of detail "A" of FIG. 19E depicting the mechanism for moving the ejection rollers up and down.
Figure 19G:
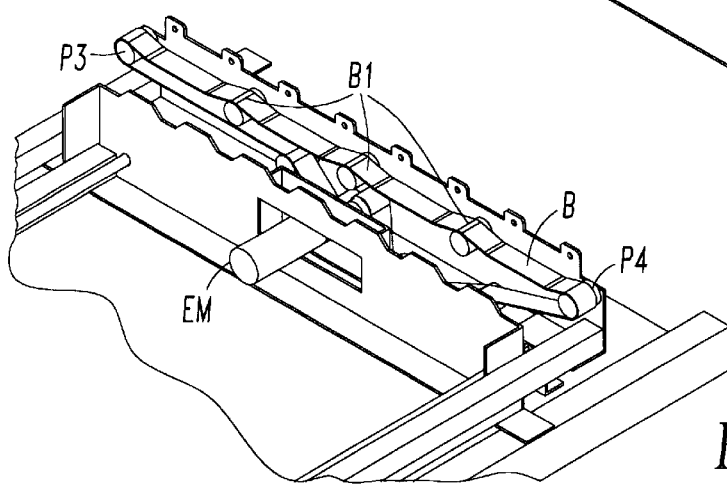
FIG. 19G is an enlarged perspective view of detail "B" of FIG. 19E depicting the mechanism for imparting selective, bi-directional, rotation of the ejection rollers.

FIGS. 19E–19G illustrate in more detail the actuating mechanisms of the rollers PR, which enable the rollers to eject trays from the conveyor belts TCB onto selected buffer wings disposed to the right or the left of the transport conveyor.

The mechanism for elevating the rollers PR above the belts TCB is best depicted in the enlarged fragmentary view of FIG. 19F. As illustrated therein, an air cylinder AC is provided transversely of the conveyor section at one end thereof and includes a pair of actuator rods AC1 and AC2 extending from the respective ends of the cylinder AC for reciprocating movement. The distal ends of the rods AC1, AC2 are in turn coupled to a chain CH, which winds around pulleys P1, P2 in an endless fashion. A cam plate CP is mounted to the rear of air cylinder AC and is movable transversely of the conveyor section in response to movement of the actuator rods AC1, AC2 and chain CH about pulleys P1, O2. The top of cam plate CP is provided with a series of notches or depressions in which the rollers PR (not shown) are normally disposed when in a down position and a plurality of peaks or cam protrusions, which engage the bottom of rollers PR and lift them above the position of the belts TCB depending upon the position of air cylinder AC transversely of the conveyer. That is, actuation of air cylinder AC causes cam plate CP to shift left or right to raise or lower the ejection rollers PR above or below the conveyor belts TCB.

FIG. 19G illustrates the mechanism for rotating the ejection rollers PR either left or right to eject trays to left or right buffer wings respectively. As illustrated, an electric motor EM, is provided in a slot in a cam plate CP and has a drive shaft thereof coupled to an endless belt EB wound around spaced pulleys P3, P4. The belt B has raised portions B1, which frictionally engage the bottom of the rollers PR and rotate the rollers left or right depending on the direction of rotation of the electric motor EM. Accordingly, a tray resting on a set of elevated rollers PR can be selectively transferred left or right into an appropriate buffer wing by the motor EM and the associated belt B by the protrusions Bi, which engage the bottom of the rollers PR.

The use of conveyor belts TCB rather than powered rollers in the main transport conveyor offers some advantages. Belts TCB transport the tray by maintaining a continuous friction contact surface with the bottom of the tray. This eliminates the probability of tray rotation caused by the sliding friction between the tray and powered rollers and the transfer of the trays between roller-conveyor zones. Since belts provide a constant contact with the tray, the potential for tray rotation is greatly minimized thereby enhancing the ability to maintain tray orientation over long distances.

Also, a belt conveyor allows the use of a single position sensor; shaft encoder SE, in lieu of multiple optical sensors to be used for tracking the progression of trays. For example, in a preferred embodiment a single shaft encoder SE associated with the drive mechanism of the belts is utilized to provide highly accurate position information for each tray moving along a conveyor section. This shaft encoder SE is zeroed by signals from the induction module IM with respect to each tray entering the system, as described above, so that the cell control computer knows where each tray is, and can activate the powerful ejector rollers to move a tray to the proper buffer wing.

Figure 19H:
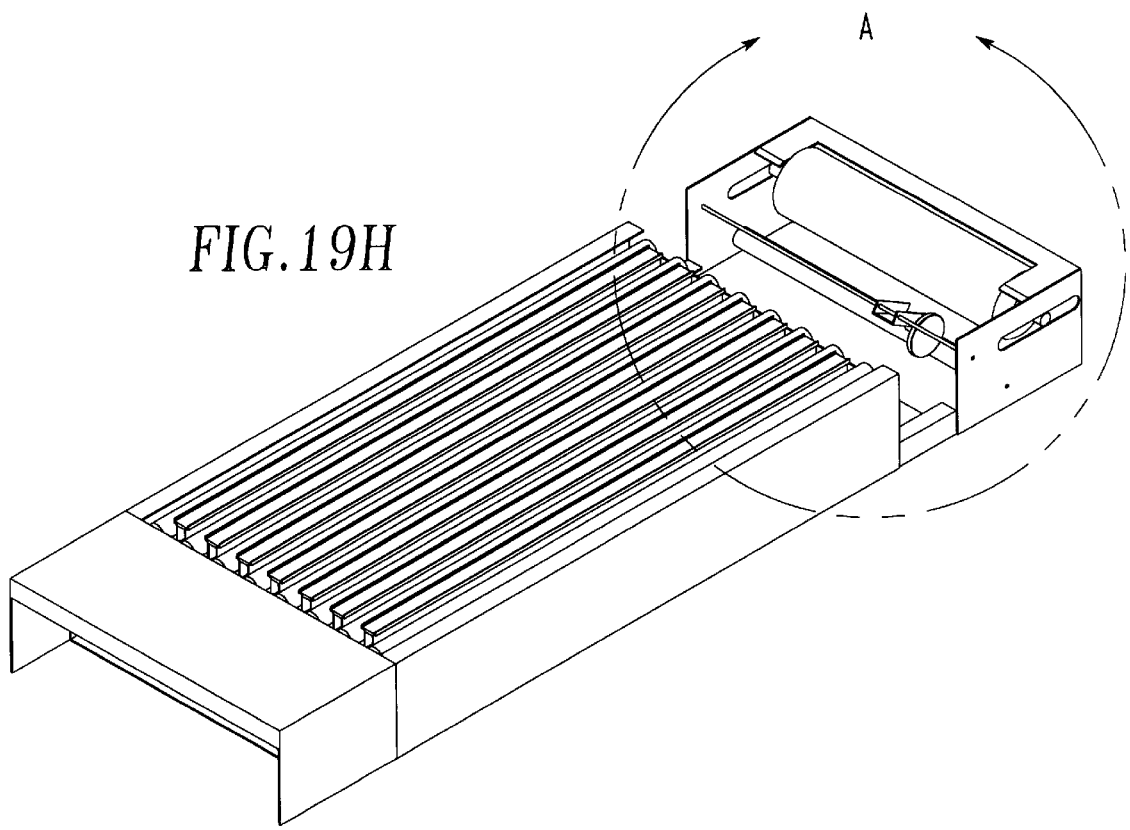
FIG. 19H is a perspective view of one section of FIG. 19A with a top plate of one end removed to depict a position encoder mechanism.
Figure 19I:
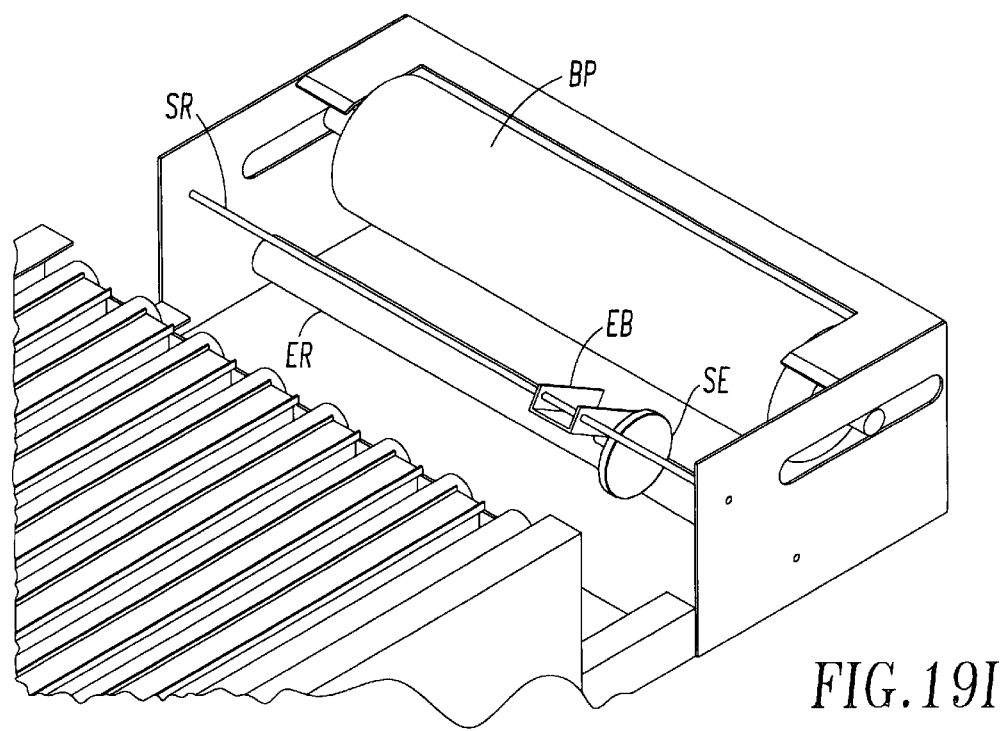
FIG. 19I is an enlarged perspective view of detail "A" of FIG. 19H.

Further details of the shaft encoder SE of the present invention are illustrated in FIGS. 19H and 19I. As illustrated therein, the shaft encoder SE is mounted on a bracket EB, which in turn is mounted on a transverse encoder slide rod SR. Encoder SE, which is depicted as a round disk, is positioned for frictionally engagement with encoder roller ER extending transversely of the conveyor mechanism and journaled in the side walls of the frame structure thereof. Encoder roller ER is rotated by the conveyor belts TCB (not shown for clarity), which are fed underneath the same, up around and over, the idler belt pulley BP disposed in slots in the side walls of the end structure of the conveyor assembly. Accordingly, it can be seen that as the belts TCB move longitudinally of the conveyor, wind around pulley BP and under encoder roller ER, that shaft encoder SE, which frictionally engages encoder roller ER, is rotated to generate encodation position signals with respect to the belts on the conveyor mechanism. Therefore, trays positioned upon the belts which have entered the system through induction module IM and sensors S are inducted into the system by the cell control computer and the position is trapped as the trays move along the conveyor.

A fourth embodiment of the present invention is shown in the system layout of FIG. 20. This system includes first and second parallel conveyors TCI and TCII. These conveyors are disposed on opposite sides of a center aisle and straddle that aisle with facing buffer wing assemblies BWI, BWII on the inside of each conveyor. Two loading manipulators 300I, 300II are mounted on tracks for movement over approximately one-half of the length of the respective layers for cooperation with the facing buffer wing assemblies in a manner described herein before. However, in this embodiment the buffer wing assemblies need not be supported on elevator structures, but may remain coplanar with the respective transport conveyors TCI, TCII. This is contrast to previously described embodiments wherein the buffer wings move up and down into operative alignment with loading manipulators 300 disposed below the level of the transport conveyors In the embodiment of FIG. 20, the loading manipulators still are moveable vertically in order to transfer one layer at a time of trays from the buffer wings into the appropriate mailing containers or pallets.

Each loading manipulator 300I, 300II also has an associated service position SPI, SPII at the distal ends of the tracks on which they are mounted. When in the service positions, good access is available to the loading manipulators to correct whatever problem might arise. This also enables one-half of the loading manipulator assembly to operate independently of the other half so that the system need not be shut down during service and repair of one of the respective loading manipulators.

Trays moving through the system of FIG. 20 enter the system on infeed conveyor 42 and pass through the first merge point M1, which intersects with the recirculation conveyor RCI or RCII from the outputs of the respective conveyors TCI, TCII. The trays are then conveyed through an identification module ID wherein the barcodes thereon are read by the reader and input into the cell control computer. Trays then pass on through a series of buffer modules 80 described herein before with respect to other embodiments, which accumulate half-trays until they can be combined downstream with other half-trays in appropriate ones of the buffer wings. Trays exiting buffer modules 80 pass on to a first diverter D1, which is connected to a reject conveyor RJ so that unacceptable, non-conforming trays may be rejected and removed from the system. The trays then pass on to a diverter D2, which divides the trays into one group directed towards transport conveyor TCI on an infeed conveyor 42I; and a second conveyor TCII via an infeed conveyer 42II.

The input to each of the conveyors includes orientation modules 88I, or 88II for orienting the trays into proper positions before they enter their respective transport conveyors TCI, TCII.

Each transport conveyor also includes an induction module IM-I, IM-II, which comprises a plurality of parallel sensors which detect the presence of a tray input to the conveyor and generate initiation signals to the shaft encoders described herein before and the computer cell controller, which tracks the position of the trays along the transport conveyors and transfers the trays to appropriate buffer wings in the manner described with respect to other embodiments of the present invention.

As each respective layer on a given buffer wing is completed the loading manipulators 300I, 300II move along the support tracks into alignment with that buffer wing and transfer the entire layer of trays onto the loading manipulator using the end defector assembly of FIG. 21 into the appropriate container or pallet. Trays passing along the transport conveyors TCI, TCII, which are not transferred to a container at this time, will emerge from the outputs ends of the transport conveyors on to the respective recirculation conveyors RCI, RCII and are fed back through the system until they are either rejected or transferred to one of the respective buffer wings.

Other features of the system of FIG. 20 such as catwalks CWI, CWII are illustrated. However, some of features of the system such as the containers per se' and the safety curtain assemblies, therefore, are not illustrated in FIG. 20 for clarity.

Controls Architecture

Figure 11:
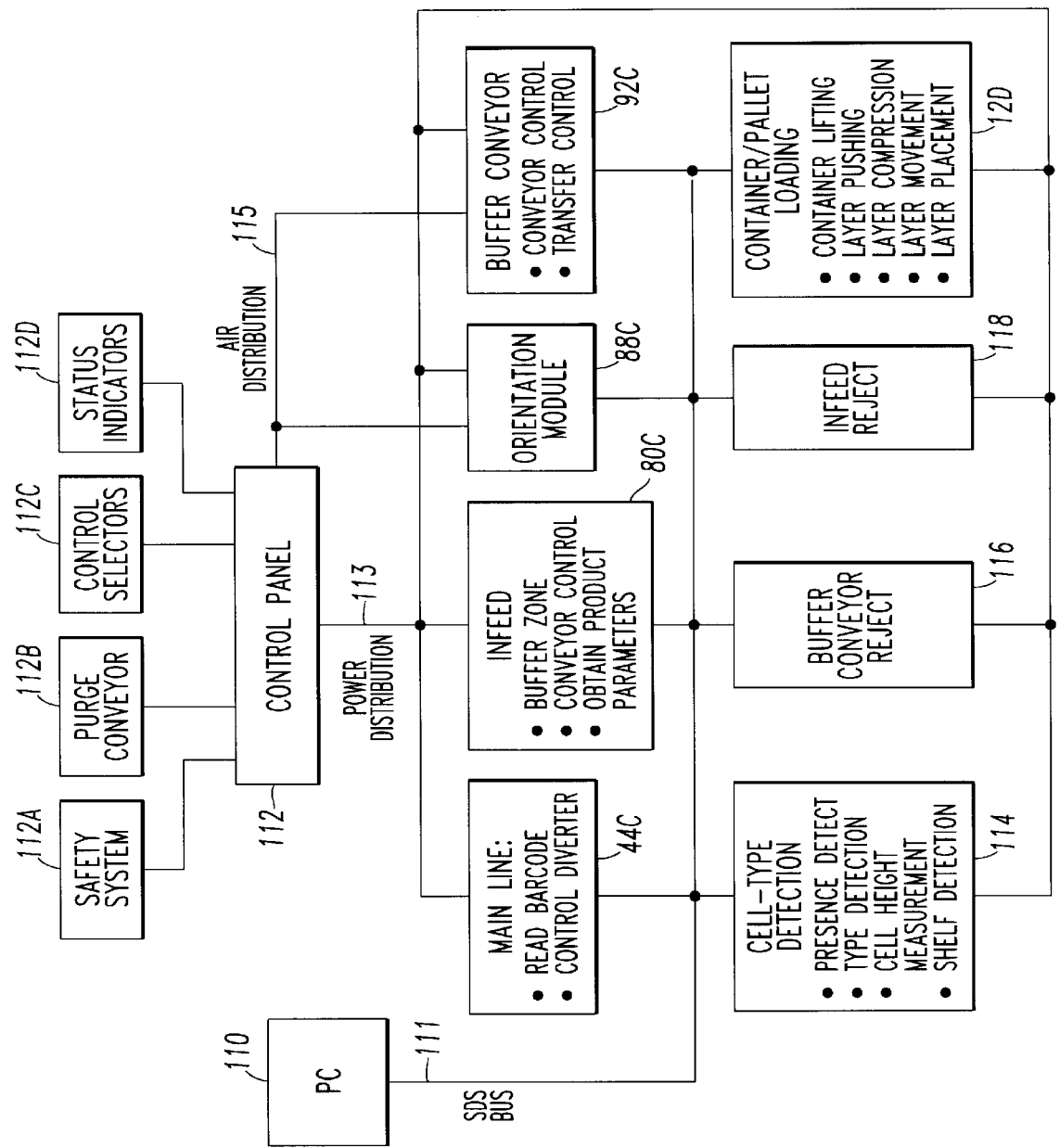
FIG. 11 is a block diagram of the controls architecture suitable for controlling the container loading systems of the present invention.

Referring to FIG. 11, a series of control blocks are illustrated, namely main line control block 44C; infeed control block 80C; orientation module control block 88C; and buffer conveyor control block 92C. Electrical power is supplied to each of these control blocks through BUS 113 and air supply is provided through air distribution BUS 115.

The MAIN LINE control block 44C performs the function of reading the barcodes on the mail trays and controlling the conveyor diverters. Infeed control block 80C controls the operation of the infeed buffer zone 80, and the transfer conveyor controls thereof. It also obtains product parameters for the trays stored in the infeed buffer zone. The orientation module 88C controls the orientation of the trays at the orientation module 88 according to the packaging criteria. The buffer conveyor control block 92C controls the operation of the conveyor sections at each buffer module and the transfer operation of the conveyor belts 95 interposed between the conveyor rollers.

FIG. 11 also illustrates another group of control blocks 114, 116, 118 and 120.

Control block 114 provides for cell-type detection, namely presence detection of trays, tray type detection, tray height measurement, and shelf detection.

Buffer conveyor reject control block 116 controls the recirculation loop of mail trays if a buffer module position to which the tray is directed is full.

Infeed reject control block 118 controls the rejection of non-conforming trays and trays that are not within the sort plan.

Control block 120 controls the operation of container pallet loading including container lifting, layer pushing, layer compression, layer movement and layer placement. The details of operation of the hardware of FIG. 11 is implemented by software architecture to be described hereinafter with reference to FIG. 12.

Software Architecture

The software is partitioned into specific functional components. The software consists of machine control software, the Human Machines Interface (HMI) software and system configuration software. The machine control software is responsible for all the machine operations. This includes the conveyor operation, SRM operation, in-line buffer operation, and fault detection. The HMI software allows the users to view the status of the system, view faults, and perform various data collection that is needed. The system configuration software allows the user to configure the Robotic Containerization System (RCS) as needed. The user has the ability to configure the system as left or right handed, as well as dual sided. The number of containers and/or pallets is also configurable.

Figure 12:
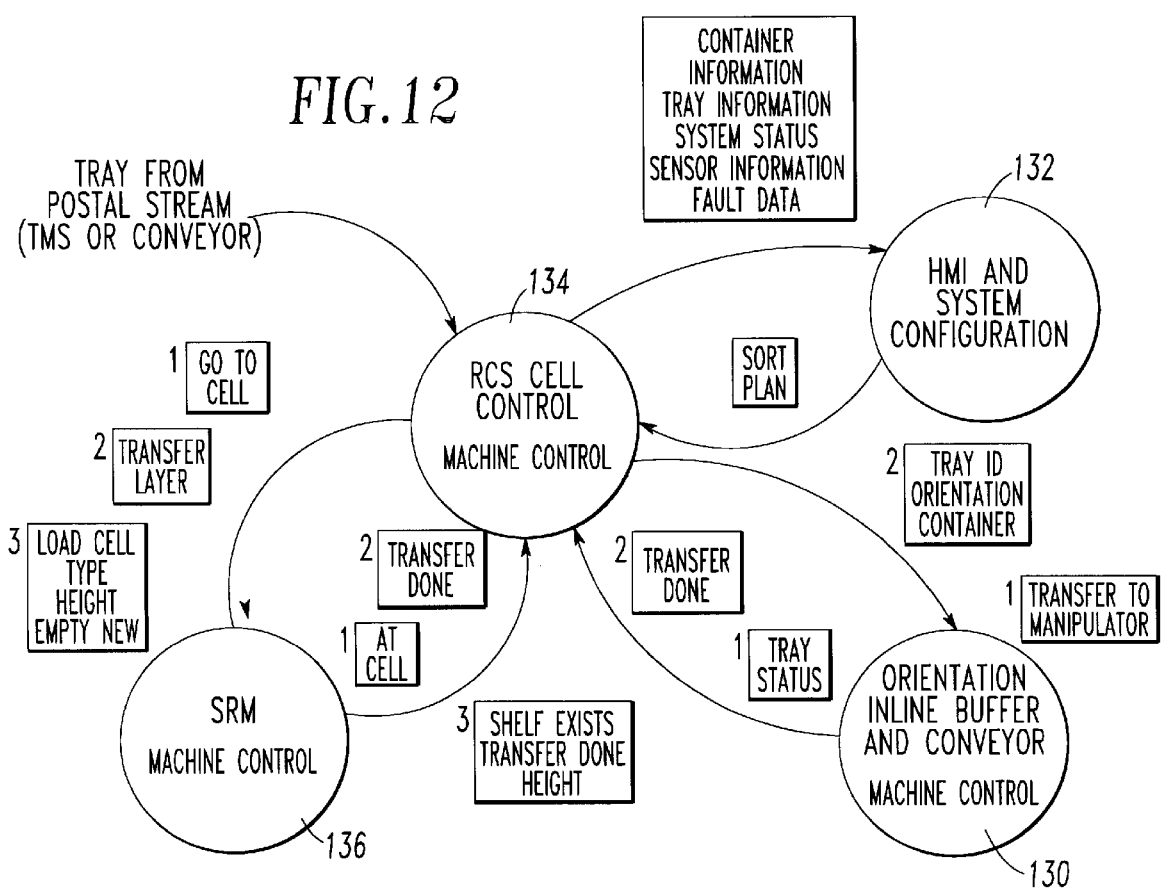
FIG. 12 is a schematic diagram of the software architecture suitable for operating the controls system of FIG. 11.

FIG. 12 depicts the high level functional data flow between the sections of software. The following is a description of the software operation of the various components of the system.

Infeed Conveyor Operation

When a tray enters the work cell, it will arrive on the infeed conveyor 42 associated with a barcode Buffer Conveyor Machine Control 130 will control the operation of the infeed conveyor, as well as track the tray along this conveyor. Any jam recovery will be handled by Buffer Conveyor Machine Control. Along the infeed conveyor, certain information must be obtained, that will be used to determine container orientation, justification and whether the tray should be rejected. RCS Cell Control 134 will be responsible for determining the container assignment, the orientation, justification, and tray rejects Once a container is determined, Buffer Conveyor Machine Control will know to which conveyor line and orientation/justification module the tray is destined. A diverter will send the tray to the correct conveyor line (assuming that there is more than one). This will be controlled by Buffer Conveyor Machine Control 130. RCS Cell Control 134 will determine the orientation and justification of the tray. This information will be used by key Handling to control the operation of the Orientation such as 88.

Orientation/Justification Module Operation

The orientation/justification module 88 is controlled by Buffer Conveyor Machine Control 150. Buffer Conveyor Machine Control will be given the orientation and justification for the tray. The tray will be oriented and aligned and sent down the conveyor to the correct in-line buffer position. The buffer position is determined before this module is entered. The tray is sent to the correct in-line buffer Buffer Conveyor Machine Control will track the tray to the correct in-line buffer module, and recover from any jams which may occur.

In-Line Buffer Module Operation

In-line buffer modules 92 are controlled by Buffer Conveyor Machine Control 130. Once a tray reaches the correct buffer module, it is put into the correct position Once a tray is successfully put into the in-line buffer module, this status is indicated to RCS Cell Control 134.

Manipulator Operation

RCS Cell Control 134 keeps track of each layer, and when a layer is complete, determines which in-line buffer module will be accessed by the manipulator. RCS Cell Control 134 notifies the SRM 136 that it needs to move to the correct in-line buffer module. Once it is determined that the SRM 136 is at the correct location, RCS Cell Control 134 will indicate to Buffer Conveyor Machine Control 130 and the loading manipulator 136 to begin transfer. Buffer Conveyor Machine Control 130 will notify RCS Cell Control 134 of a successful transfer. Once a successful transfer has been confirmed from both Buffer Conveyor Machine Control 130 and the loading manipulator (SRM) 136, RCS Cell Control 134 will signal the manipulator (SRM) 136 to transfer the layer into the container.

Buffer Conveyor Machine Control Tasks 130

Tracking of trays from the infeed conveyor 42 to the in-line buffer module 92

Control of the diverter (not shown) to the correct orientation/justification module 88 based on container destination.

Control of the in-line buffer module 92.

Jam recovery from the infeed conveyor 42, 101 to the in-line buffer module.

Description of Operation

This section describes the operating scenario of the RCS system of the present invention. It outlines the flow of mail trays into the RCS as well as detailed operations within the work cell.

System Control Operations

The system controls includes the computer hardware of FIG. 11 and software of FIG. 12 required to operate the RCS. This includes the interface to an existing United States Postal System (USPS) "starship" system, sort plan generation, reports and on-line data, and sort monitoring.

The RCS system must interface to existing USPS systems to obtain data such as default processing schedules and also allows for the remote access to cell activity reports, cell failure/trouble logs.

The sort plan generation is a function performed by In-Plant Support personnel within the Robotic Containerization System (RCS) system of the present invention. A default sort plan is downloaded and stored within the RCS computer 110. The sort plan may be changed in real time by authorized personnel.

Raw report information is stored within a SQL database on the RCS computer 110. This information may be shared with other USPS systems using an ORACLE database. The RCS system allows USPS personnel to generate reports.

Below is a list of the USPS personnel and the types of reports that will be generated Floor Supervisors: Volume Reports, Routing and scheme reports Plant Management: Summary and Detail Volume reports, Availability reports, Performance reports.

Maintenance Personnel: Failure Logs, Maintenance Logs, Routines/downtimes.

General: Cell Activity Report, Cell Performance Report, Zip Code distributions, barcode read-rates.

The RCS system includes a Human Machine Interface (HMI) 112, 132, which includes a graphical depiction of the system operation as well as system status. Other information such as tray barcodes, container details, robot status are also available via the User Interface.

The HMI also provides an on-line Maintenance mode to check various functions of the system. The operator will be able to control conveyor operation, in-line buffer operation and orientation/justification operation from the user screen.

Tray Induction

The RCS interfaces to a Tray Management System (TMS) or other existing conveyor. Trays and tubs are diverted into the work cell based upon a barcode. The barcode is read, and any tray or tub contained in the sort plan is passed into the RCS.

Infeed Conveyor

Once inducted into the system, the tray enters an infeed conveyor 42. At this point, the tray is checked for a DNR tag by reader 44. The tray or tub is checked to determine height, width and length. The barcode and/or DNR tag, as well as height and length, are used to determine the tray/tub container destination.

Since the RCS is used to fill containers and pallets with tubs, EMM trays, MM trays and ½ MM trays, criteria must be used to determine the best tray/tub placement. The criteria refer to "buffer positions" which, in combination, correspond to tray/tub placement positions. FIG. 9 depicts the buffer positions on the In-line Buffer Module. Operation, of the In-line Buffer Module is detailed in all embodiments described hereinbefore. Each in-line buffer has up to 10 buffer positions in the various embodiments, which are used to store half trays and trays waiting to be transferred to the container or pallet. The buffer positions are used in different combinations to achieve the "brick laying" or column stacking effect depicted in FIGS. 6, 7, 9, 9A, 9B, and 9C.

Orientation/Justification Module

An Orientation/Justification Module 88 is used to orient and justify trays entering the system. In a right or left handed system, there will only be one Orientation/Justification Module 88. In a dual sided system, there will be two Orientation/Justification Modules 88. In a single sided system, the Orientation/Justification Module 88 will pass the rejected trays to the reject conveyor, and orient and justify the trays to the correct position. In a dual sided system, the first Orientation/Justification Module 88 will orient and justify the trays that have destinations on the conveyor which it services. If the tray is a reject or has a destination on the other conveyor line, the first Orientation/Justification Module 88 will pass the tray to the second Orientation/Justification Module 88 where it will either pass the tray to the reject conveyor or orient and justify the tray.

Figure 13:
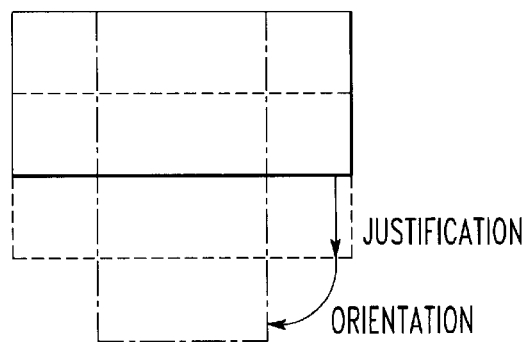
FIG. 13 is an illustration showing tray orientation and justification in the orientation modules of the present invention.

The Orientation/Justification Modules' 88 purpose is to rotate the product into the correct orientation for it to be inserted into the container It also positions the product at the proper location on the powered roller conveyor in order to fit into the In-line Buffer Module. The orientation and justification can be thought of as rotating and sliding pieces of a puzzle together to form the correct fit. FIG. 13 shows the process of orientation and justification In the RCS, the location is determined by the pattern being built on an In-line Buffer Module for loading into a particular container/pallet.

In order to accomplish the three objectives required to the Orientation/Justification Module 88, passing a tray, orientating a tray and justifying a tray, information must be exchanged between these modules and the rest of the controls. Any conditions causing rejection of a particular tray need to be input to the Orientation/Justification Module 88. These include tray too long, tray too wide, tray too tall, no read, and out of sort plan. The Orientation/Justification Module 88 only needs to know whether a tray is to be processed or rejected. The application software will then be responsible to provide for unique handling conditions dependent on the reject type and to provide the flexibility of sort-plan dependent rejection. For example, in one sort-plan no-read trays could be rejected while in a different sort-plan no-read trays could sort to a particular container.

The function of orientation would require that six conditions be passed into the modules:

pass product to next module—straight through acting as conveyor reject product—transfer minus 90 degrees correct orientation—transfer 90 degrees into In-line Buffer Module 180 degree reorientation—then 90 degree transfer 90 degree reorientation—then 90 degree transfer Minute 90 degree reorientation—then 90 degree transfer The second Orientation/Justification Module 88 would not require the first two conditions.

Ideally for maximum throughput, the Orientation/Justification Module would not have to return to a "home" position before receiving the next tray. In order to properly justify the tray to the correct edge of the conveyor, the Orientation/Justification Module 88 would need to receive only one of two states; inside of conveyor or outside of conveyor. If the tray length is oriented across the width of the conveyor in the In-line Buffer Module then the tray positioning can only be in the center of the conveyor.

In-Line Buffer Modules

The In-line Buffer Module is used to store trays/tubs until ready for transfer into the container or pallet. Three embodiments of In-Line Buffer Modules have been described hereinbefore.

Flowchart

The process flow of a mail tray passing through the system of the present invention is illustrated in FIGS. 14 to 17. Reference should be made to the second embodiment of FIGS. 8 to 10 as an exemplary embodiment on which the flowcharts of FIGS. 14 to 17 are based.

Figure 14:
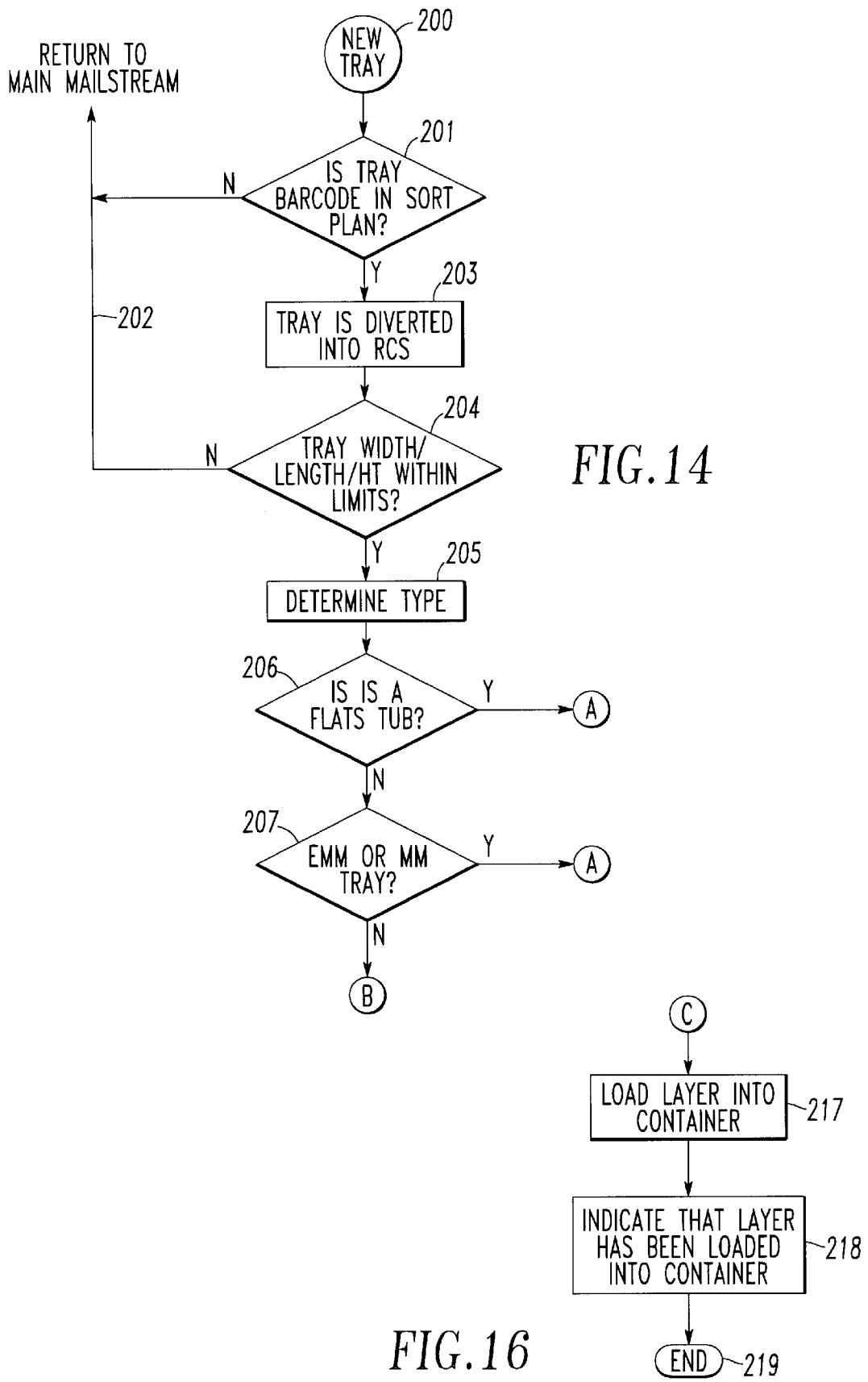

In FIG. 14 a new tray enters the system at step 200 and passes past a barcode reader, which asks the question in decision block 201 "Is tray barcode in sort plan?" If the answer is NO, the tray returns to the main stream through loop 202. If the answer is YES, the tray continues into the robotic containerized loading system as indicated by block 203. The tray then passes through another reader mechanism as illustrated in step 204 and the reader determines if the tray width, length, and height are within acceptable limits If the answer is NO, the tray returns to the mainstream path 202. If the answer is YES, the tray type is then determined in step 205. In step 216 it is asked whether the tray is a flat tub. If YES, the program proceeds to subroutine (A). If NO, the software program proceeds to step 207. In step 207 it is asked whether the tray is GMEMM or MM tray. If YES, the software proceeds to subroutine (A). If NO, the software proceeds to subroutine (B).

Figure 15:
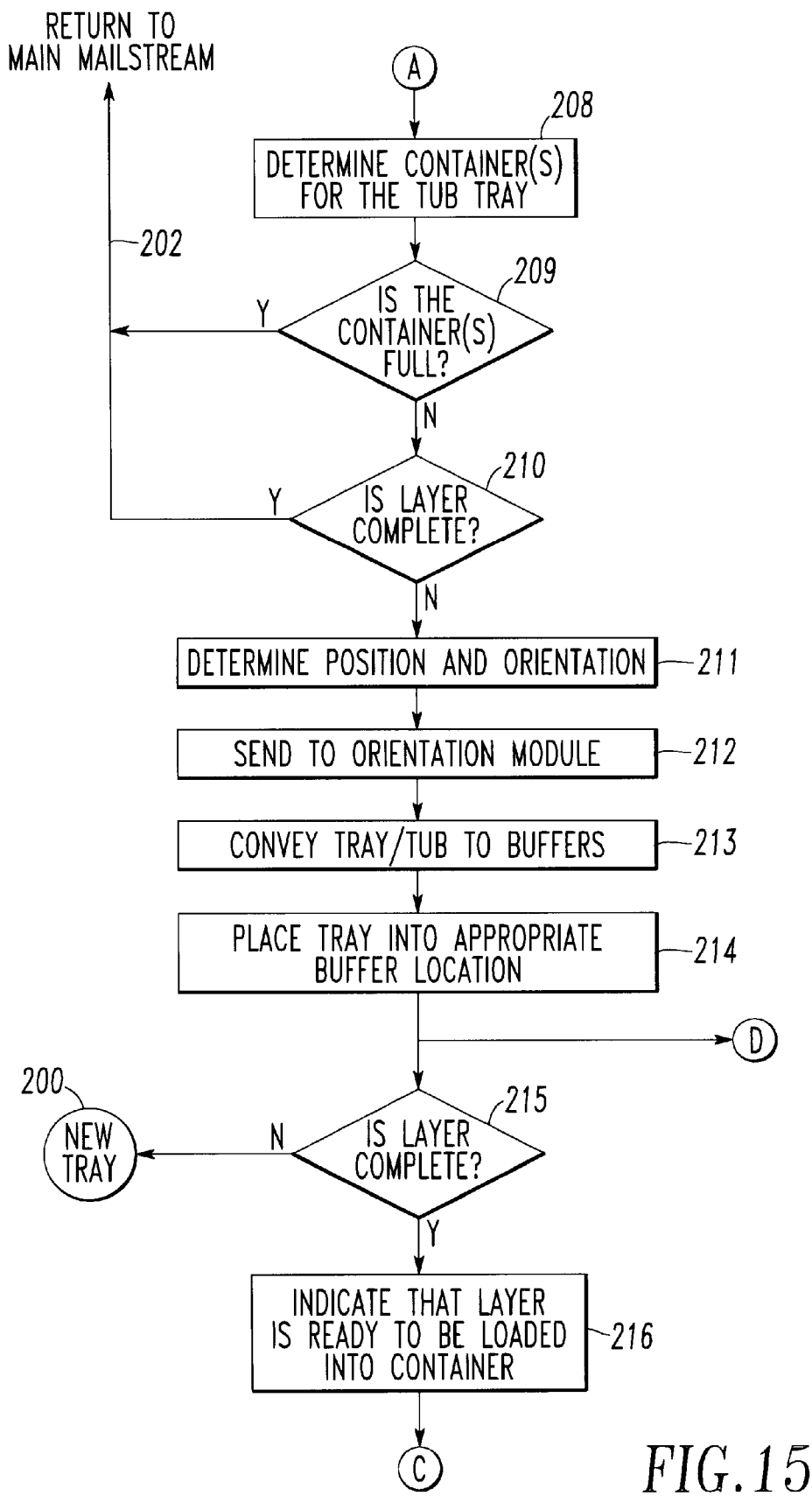

Referring to FIG. 15, there is illustrated subroutine (A) of the flowchart. Beginning at step 208, it is determined for which container(s) is the tray destined. In step 209 it is asked if the container is full? If YES, the tray returns to mainstream 202. If NO, the software proceeds to step 210, which asks if the layer is complete? If YES, the tray returns to mainstream 202, if NO, the software proceeds to step 211 to determine the position and orientation desired for the tray. The position and orientation so determined is sent to the orientation module at step 212, and once oriented the tray convey control signal is initiated at step 213. At step 214 the command is given to place the tray into the proper buffer location. At step 215 it is asked whether the layer is complete if NO, the software routine returns to 200 with a new tray. If YES, a command is generated to indicate that the layer is ready to be loaded into the container. The program then proceeds to subroutine (C).

Referring to subroutine (C) in FIG. 16, step 217 is a command to load the layer into the container. Step 218 is a command to indicate that the layer has been loaded into the container. That is, a signal associated with the load manipulator will advise the central processor that the layer has been loaded. The software then proceeds to the END at step 219.

Figure 17:
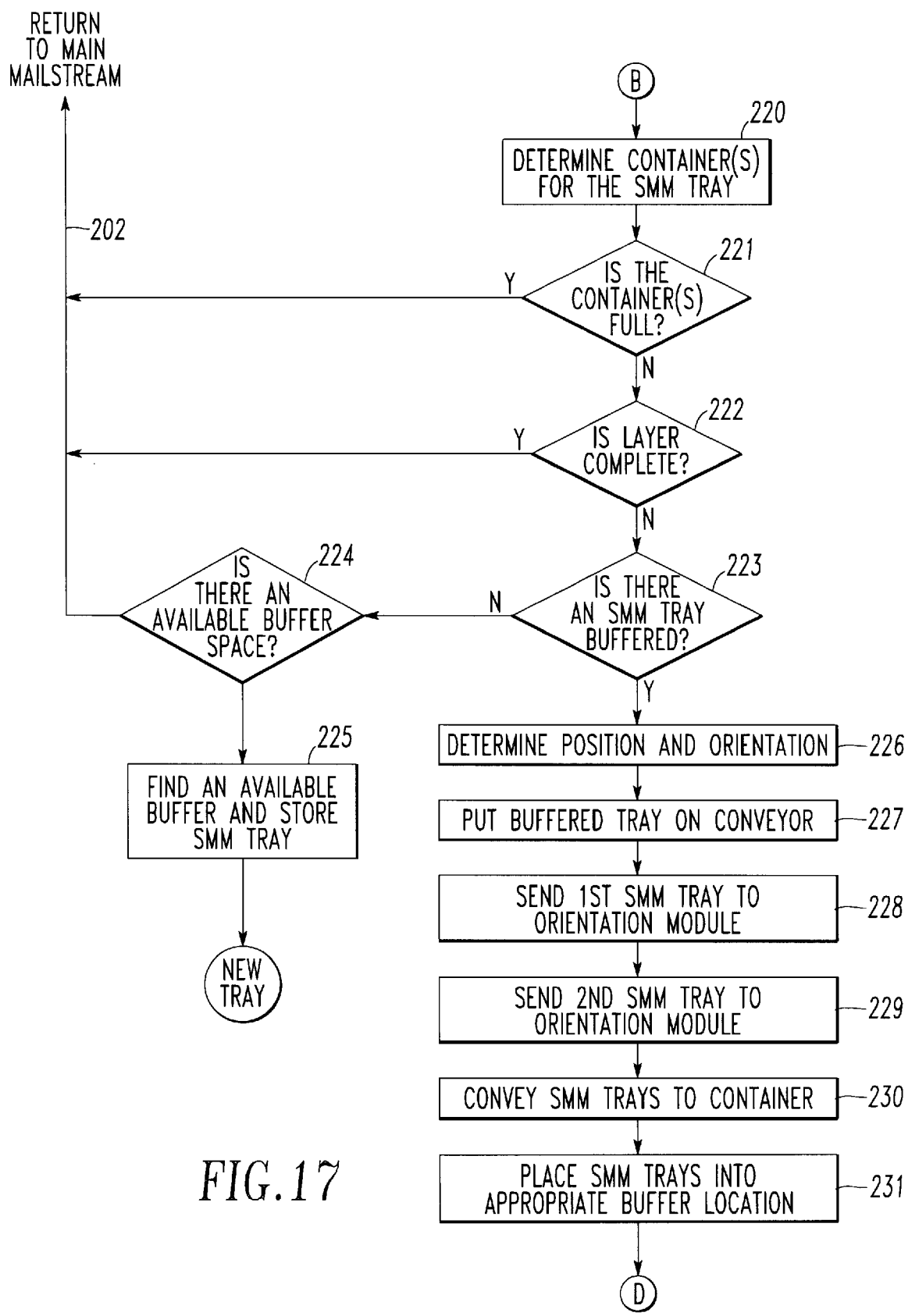

Referring to FIG. 17 is subroutine (B), beginning with step 220, which identifies containers that are to receive SMM (½ MM) trays. Step 21 asks is the container to which it is assigned full? If YES, the container returns to mainstream 202. If NO, the software proceeds to step 222 and asks the layer is complete? If YES, the container returns to mainstream 202, if NO, the software proceeds to step 223, which asks if there is an SMM tray buffer? If NO, the software proceeds to step 224 and asks if there is an available buffer space, If NO, the tray returns to 202, the mainstream. If YES, the software proceeds to step 225 and asks the question if an available buffer storage zone for an SMM tray is available, and if so, where is it located? The software then asks for a new tray at 202 to be fed into the system. If the answer to step 223 is YES, step 226 then determines the position and orientation of the tray being processed. In step 227, a command is initiated to put the buffered tray onto the conveyor. In step 228, the command is to send the first SMM tray to the orientation module 88. In step 229, the software commands the system to send the second SMM tray to the orientation module 88. In step 230 the software commands the system to convey both SMM trays to the appropriate container. In step 231 the software commands the system to place SMM trays into appropriate buffer locations. The software then proceeds to subroutine (D).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. Apparatus for automatically forming a plurality of packages of groups of articles comprising:

transport conveyor means for moving a plurality of the articles along a conveying path in a substantially continuous motion;

a plurality of buffer storage assemblies disposed in spaced positions along the conveying path, each buffer storage assembly being capable of receiving articles from the transport conveyor while other articles thereon sustain substantially continuous movement;

transfer means for selectively moving selected articles from the transport conveyor to selected ones of the buffer storage assemblies in response to selection control signals; and control means for generating the selection control signals according to predetermined packaging criteria for each package of the plurality of groups of articles to be formed at each of the respective buffer storage assemblies.

2. The apparatus of claim 1 wherein, said transfer means comprises elevator assemblies for selectively lifting the articles from the transport conveyor into buffer positions associated with the buffer storage assemblies.

3. The apparatus of claim 2 wherein, said elevator assemblies include a plurality of support fingers vertically movable between the transport conveyor and the buffer storage assemblies, said fingers engaging and lifting the groups of articles to the buffer positions.

4. The apparatus of claim 3 wherein, the transport conveyor includes a plurality of spaced rollers and the fingers are vertically movable between the rollers.

5. Apparatus of claim 2 wherein the buffer positions are disposed above the transport conveyor at a height which is sufficient to permit articles moving on the transport conveyor to other destinations to pass beneath articles stored in the buffer positions.

6. Apparatus of claim 5 wherein each elevator assembly includes a plurality of in-line shelves disposed longitudinally of the transport conveyor, each shelf being separately movable between the transport conveyor and buffer storage positions in response to the selection control signals.

7. Apparatus of claim 6, wherein the shelves are arranged in pairs, the respective shelves of each pair extending transversely of the transport conveyor from opposite sides of the transport conveyor.

8. Apparatus of claim 7 wherein each shelf includes a plurality of parallel conveyor belts.

9. Apparatus of claim 6 wherein each shelf includes a plurality of parallel conveyor belts.

10. Apparatus of claim 5, wherein the buffer storage assemblies are disposed on both left and right sides of the transport conveyor, and there is further provided a loading manipulator disposed below the transport conveyor for selective alignment with a chosen buffer assembly on the right or left sides when the control means signals that a transferable layer of articles in that buffer assembly is ready for transfer, and buffer elevator mechanisms for each buffer storage assembly for lowering that buffer assembly into lateral alignment with the loading manipulator and returning the buffer assembly to a plane of the conveying path of the transport conveyor once the layer of articles is transferred from the buffer assembly to the loading manipulator.

11. Apparatus of claim 10 further including a stop plate on one edge of each buffer assembly having a linear surface orthogonal to the longitudinal axis of the transport conveyor, a movable compression plate disposed on an opposite edge of the buffer assembly, said movable compression plate having a linear compression surface parallel to the linear surface of the stop plate, and a compression actuator for moving said compression plate toward said stop plate to edge justify the layer of articles in the buffer assembly against the stop plate prior to transfer of the layer to the loading manipulator.

12. Apparatus of claim 11 wherein the elevator mechanism comprises a scissors support device and a hydraulic actuator for moving the scissors to lower or raise the buffer assembly.

13. Apparatus according to claim 10 wherein said loading manipulator includes an extensible end effector for engaging a layer of articles on the buffer assembly and transferring the layer to a container or pallet, the end effector having upper and lower extensible sections, the upper section having a sweep gate mounted thereon, the top section being capable of extension into proximity with the transferable layer on the buffer assembly, the sweep gate being capable of sweeping the layer onto the lower section, the lower section being movable between the buffer assembly and the container or pallet to support the layer on a support surface thereof and carry the layer therebetween, the upper section also being movable between the buffer assembly and container or pallet, the sweep gate being capable of restraining the layer in the container or on the pallet when the lower section is retracted to permit the support surface of the lower section to move out from under the layer.

14. The apparatus of claim 1 wherein, the transfer means include substantially horizontal shelf assemblies including ejection conveyors for discharging the groups of articles to an associated packaging station in response to ejection control signals.

15. The apparatus of claim 1, further comprising loading manipulator means for receiving groups of articles ejected from the buffer storage assemblies and placing them on package support devices at the packaging stations.

16. Apparatus of claim 15 wherein said loading manipulator comprises a platform assembly for receiving a layer of articles stored in a buffer assembly;

means for moving the platform assembly into a packaging container in which a package will be formed to deposit the layer of articles therein; and lift means for moving the platform assembly vertically into alignment with the layer of articles in the buffer assembly and to selected levels in the container.

17. Apparatus of claim 16 wherein the platform assembly includes telescoping sections selectively extendable toward the buffer assemblies and into the container.

18. Apparatus of claim 16 further including means for moving the loading manipulator to selected buffer assemblies and packaging containers.

19. The apparatus of claim 1, further including orientation means for selectively positioning articles on the transport conveyor upstream of the buffer assemblies along the conveyor paths so that individual articles within each group may be oriented according to said predetermined packaging criteria.

20. Apparatus of claim 19 wherein the orientation means comprises:

a gripper assembly for engaging the articles and rotating the articles to selected orientations consistent with the packaging criteria.

21. Apparatus of claim 19 wherein said orientation means includes pop-up pins which protrude above a top surface of the transport conveyor, engage selected portions of moving articles, and rotate the articles to selected orientations.

22. The apparatus of claim 1, further including coding on each of said articles for indicating the buffer storage assembly to which the article will be transferred, in an orientation pattern consistent with the packaging criteria for the group of articles in which each article will be included, and said control means includes means for reading the coding and generating the selection control signals supplied to the transfer means.

23. The apparatus of claim 22, further including reject means responsive to the reader means for ejecting, undesired articles from the transport conveyor.

24. The apparatus of claim 1, further comprising recirculation means for receiving overflow articles from the buffer storage assemblies when filled beyond capacity and returning the articles to an input end of the transport conveyor.

25. Apparatus of claim 1 wherein the groups of articles are storable in the buffer assemblies in a layer corresponding to one layer of a plurality of layers to be assembled in one of the plurality of packages, the entire layer in the buffer assemblies being transferable into the packages at one time after assembly of that layer is completed from the accumulation of individual articles, transferred from the transport conveyor.

26. Apparatus of claim 1 wherein said buffer storage assemblies are disposed laterally of the transport conveyor and the transfer means moves the articles laterally thereto.

27. Apparatus of claim 26 wherein the transport conveyor includes a plurality of spaced powered rollers and the transfer means includes conveyor belts interleaved between the rollers, means for raising the conveyor belts above the powered rollers to lift the articles therefrom, and means for rotating the belts to eject the articles into the buffer assemblies.

28. Apparatus of claim 27 wherein said buffer storage assemblies includes a buffer storage surface defined by a plurality of unpowered idler rollers on axes perpendicular to axes of the powered rollers whereby articles transferred from the transport conveyor are freely movable along the idler rollers.

29. Apparatus of claim 26 wherein the transport conveyor includes a plurality of spaced conveyor belts powered for longitudinal movement along a conveying path and the transfer means includes a plurality of powered rollers interleaved between the belts, means for raising the rollers above the belts to lift the articles thereform and means for rotating the rollers to eject the articles transversely of the belts into the buffer assemblies.

30. Apparatus of claim 29, wherein said buffer storage assemblies include a buffer storage surface defined by a plurality of unpowered idler rollers on axes parallel to axes of the powered rollers whereby articles transferred from the transport conveyor are freely movable along the idler rollers.

31. Apparatus of claim 30, wherein said powered rollers are selectively rotatable in opposite directions to thereby laterally transfer the articles to the right or left of the transport conveyor.

32. Apparatus of claim 30, further including shaft encoder mechanisms coupled to drive shafts associated with the belts for determining the positions of the belts of the conveyors and thus articles thereon, and sending associated position signals to said control means.

33. Apparatus of claim 32, further including sensor means at an entrance to the transport conveyor for sensing entry of articles thereto and generating enable signals to the shaft encoder mechanisms to initiate transmission of the position signals to the control means.

34. Apparatus of claim 29, wherein said powered rollers are selectively rotatable in opposite directions to thereby laterally transfer the articles to the right or left of the transport conveyor.

35. Apparatus of claim 29, wherein the buffer storage assemblies are disposed on both left and right sides of the transport conveyor and there is further provided a loading manipulator disposed below the transport conveyor for selective alignment with a chosen buffer assembly on the right or left sides when the control means signals that a transferable layer of articles in that buffer assembly is ready for transfer, and, buffer elevator mechanisms for each buffer storage assembly for lowering that buffer assembly into lateral alignment with the loading manipulator and returning the buffer assembly to a plane of the conveying path of the transport conveyor once the layer of articles is transferred from the buffer assembly to the loading manipulator.

36. Apparatus of claim 35, further including a stop plate on one edge of each buffer assembly having a linear surface orthogonal to the longitudinal axis of the transport conveyor, a movable compression plate disposed on an opposite edge of the buffer assembly, said movable compression plate having a linear compression surface parallel to the linear surface of the stop plate, and a compression actuator for moving said compression plate toward said stop plate to edge justify the layer of articles in the buffer assembly against the stop plate prior to transfer of the layer to the loading manipulator.

37. Apparatus of claim 36 wherein the elevator mechanism comprises a scissors support device and a hydraulic actuator for moving the scissors to lower or raise the buffer assemblies.

38. Apparatus according to claim 35, wherein said loading manipulator includes an extensible end effector for engaging a layer of articles on the buffer assembly and transferring the layer to a container or pallet, the end effector having upper and lower extensible sections, the upper section having a sweep gate mounted thereon, the top section being capable of extension into proximity with the transferable layer on the buffer assembly, the sweep gate being capable of sweeping the layer onto the lower section, the lower section being movable between the buffer assembly and the container or pallet to support the layer on a support surface thereof and carry the layer therebetween, the upper section also being movable between the buffer assembly and container or pallet, the sweep gate being capable of restraining the layer in the container or on the pallet when the lower section is retracted to permit the support surface of the lower section to move out from under the layer.

39. Apparatus of claim 38 wherein each extensible section includes at least two telescoping parts.

40. Apparatus according to claim 29 further including a safety assembly associated with each of a plurality of containers or pallets to be loaded with the layers of articles, said safety assembly comprising:
a frame surrounding the container or pallet; and
a curtain mounted on said frame, said curtain being selectively movable over a discharge opening defined in a rear side of the frame, or an input opening in the front side of the frame facing the buffer assemblies, to open one of those openings while choosing the other, to thereby shield a worker unloading the container or pallet from the loading manipulator.

41. Apparatus according to claim 26, further including a safety assembly associated with each of a plurality of containers or pallets to be loaded with the layers or articles, said safety assembly comprising:
a frame surrounding the container or pallet; and
a curtain mounted on said frame, said curtain being selectively movable over a discharge opening defined in a rear side of the frame, or an input opening in the front side of the frame facing the buffer assemblies, to open one of those openings while closing the other, to thereby shield a worker unloading the container or pallet from the loading manipulator.

42. Apparatus of claim 41 further including a track extending around said frame, and means for movably supporting the curtain in said track.

43. Apparatus of claim 42 wherein said curtain includes a plurality of vertical slats, hinged together on vertical edges thereof.

44. Apparatus according to claim 26 comprising first a second transport conveyors for selectively receiving articles moving along the conveying path, the longitudinal axis of the transport conveyors being parallel, a plurality of buffer assemblies being provided along each transport conveyor on a side thereof facing the other transporter conveyor, and a loading manipulator disposed between the respective groups of buffer assemblies of the first and second transport conveyors, said loading manipulator being movable longitudinally of the conveyors into selective lateral alignment with chosen ones of the buffer assemblies as instructed by the control means.

45. Apparatus according to claim 1 further including a safety assembly associated with each of a plurality of containers or pallets to be loaded with the layers of articles, said safety assembly comprising:
a frame surrounding the container or pallet; and
a curtain mounted on said frame, said curtain being selectively movable over a discharge opening defined in a rear side of the frame, or an input opening in the front side of the frame facing the buffer assemblies, to open one of those openings while choosing the other, to thereby shield a worker unloading the container or pallet from the loading manipulator.

46. Apparatus of claim 45 further including a track extending around said frame, means for movably supporting the curtain in said track.

47. Apparatus of claim 46 wherein said curtain includes a plurality of vertical slats, hinged together on vertical edges thereof.

48. The apparatus of claim 1, wherein the articles comprise mail trays.

49. A method for automatically forming a plurality of packages of groups of articles comprising the steps of:
moving a plurality of the articles along a conveying path in a substantially continuous motion;
selectively moving selected articles from the conveying path to selected buffer storage assemblies in response to selection control signals;
generating the selection control signals according to predetermined packaging criteria for each package of the plurality of groups of articles to be formed at each of the respective buffer storage assemblies;
storing groups of articles in the buffer assemblies in a layer corresponding to one layer of a plurality of layers to be assembled in one of the plurality of packages; and
transferring the entire layer in the buffer assemblies into the packages at one time after assembly of that layer is completed from the accumulation of individual articles, transferred from the conveying path.

50. The method of claim 49, further including the step of selectively orienting articles in the conveying path upstream of the buffer assemblies so that individual articles within each group may be oriented according to said predetermined packaging criteria.

51. The method of claim 50 wherein the articles are substantially rectangular first size trays having longitudinal axes, and the axes of the trays in the respective layers are relatively oriented to form selected patterns.

52. The method of claim 51 wherein the pattern includes at least three trays with the respective axes parallel.

53. The method of claim 52 including the further steps of:
determining the height of the first size trays;
monitoring the buffer locations of second size trays determined to be than the first size trays taller in a given buffer layer; and directing other said second size trays to the next layer buffered to positions such that the two successive layers are stackable in a package in a substantially level arrangement.

54. The method of claim 51 wherein the axes of at least two trays are parallel and one or more trays have axes orthogonal to the axes of the at least two trays thereby forming a brick-laid pattern.

55. The method of claim 54 including the further step of determining the length of the first size trays, separating and storing second size trays which are half the length of the first size trays, grouping the second size trays into pairs, and inserting the pairs into a layer being formed in a buffer assembly to approximate a standard tray.

56. The method of claim 54 including the further steps of:

determining the height of the first size trays;

monitoring the buffer locations of second size trays determined to be taller than the first size trays in a given buffer layer; and directing other said second size trays to the next layer buffered to positions such that the two successive layers are stackable in a package in a substantially level arrangement.

57. The method of claim 51 including the further step of determining the length of the first size trays, separating and storing second size trays which are half the length of the first size trays, grouping the second size trays into pairs, and inserting the pairs of second size trays into a layer being formed in a buffer assembly to approximate a first size tray.

58. The method of claim 49 wherein the articles are substantially rectangular first size mail trays having longitudinal axes, and the axes of the trays in the respective layers are relatively oriented to form selected patterns.

59. The method of claim 58 including the further steps of:

determining the height of the first size mail trays;

monitoring the buffer locations of second size mail trays determined to be taller than the first size mail trays in a given buffer layer; and directing other said second size mail trays to the next layer buffered to positions such that the two successive layers are stackable in a package in a substantially level arrangement.

60. The method of claim 49, wherein the articles comprise mail trays.

61. Apparatus for transferring a plurality of articles to be stacked in layers in a container or on a pallet between a buffer storage assembly which accumulates the articles, one of said layers at a time, and the container or pallet comprising:

an extensible end effector for engaging the layer of articles on the buffer assembly and transferring the layer to the container or pallet, the end effector having upper and lower extensible sections, the upper section having a sweep gate mounted thereon, the top section being capable of extension into proximity with the transferable layer on the buffer assembly, the sweep gate being capable of sweeping the layer into the lower section, the lower section being movable between the buffer assembly and the container or pallet to support the layer on a support surface thereof and carry the layer therebetween, the upper section also being movable between the buffer assembly and container or pallet, the sweep gate being capable of restraining the layer in the container or on the pallet when the lower section is retracted to permit the lower support surface of the section to move out from under the layer.

62. Apparatus of claim 61 wherein each extensible section includes at least two telescoping parts.

* * * * *